US010175765B2

(12) United States Patent
Wada et al.

(10) Patent No.: US 10,175,765 B2
(45) Date of Patent: Jan. 8, 2019

(54) INFORMATION PROCESSING DEVICE, INFORMATION PROCESSING METHOD, AND COMPUTER PROGRAM

(71) Applicant: Sony Computer Entertainment Inc., Tokyo (JP)

(72) Inventors: Shinya Wada, Kanagawa (JP); Hiroyuki Segawa, Kanagawa (JP); Akio Ohba, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 535 days.

(21) Appl. No.: 14/791,831

(22) Filed: Jul. 6, 2015

(65) Prior Publication Data
US 2016/0034040 A1    Feb. 4, 2016

(30) Foreign Application Priority Data

Jul. 29, 2014 (JP) ................. 2014-154242

(51) Int. Cl.
G06F 3/01      (2006.01)
G06K 9/00      (2006.01)
H04N 13/02     (2006.01)

(52) U.S. Cl.
CPC .............. G06F 3/017 (2013.01); G06F 3/011 (2013.01); G06K 9/00201 (2013.01);
(Continued)

(58) Field of Classification Search
CPC ..... G06F 3/017; G06T 7/0075; G06T 7/2093; H04N 13/0468
See application file for complete search history.

(56) References Cited

U.S. PATENT DOCUMENTS 6,556,199 B1 *  4/2003  Fang ............... G06T 15/005
                                                345/424
2002/0144231 A1 * 10/2002  Hariya ............ G06T 17/20
                                                716/55
(Continued)

FOREIGN PATENT DOCUMENTS

EP    2 615 580      7/2013
JP    05-280941      10/1993
(Continued)

OTHER PUBLICATIONS

Japanese Notification of Reasons for Refusal, dated May 31, 2016 from corresponding Application No. 2014-154242.
(Continued)

Primary Examiner — Shawn S An
(74) Attorney, Agent, or Firm — Katten Muchin Rosenman LLP

(57) ABSTRACT

An information processing device that detects the position of a subject shot by a camera in a three-dimensional space is provided. The information processing device includes a depth image acquiring section that acquires a depth image in which the distance of a subject in the depth direction from the camera is represented as a pixel value on an image plane, a spatial structure identifying section that identifies the position of a plane forming a predetermined angle with a gravity vector among subject surfaces by detecting a coordinate point collection representing the plane on the basis of the distribution of coordinate points obtained by inverse projection of pixels of the depth image to the three-dimensional space based on the direction of the gravity vector, and a target object extracting section that generates and outputs position information of a predetermined target object on the basis of the position of the plane.

10 Claims, 21 Drawing Sheets

(52) U.S. Cl.
CPC ..... *G06K 9/00362* (2013.01); *H04N 13/0239* (2013.01); *H04N 13/0271* (2013.01)

(56) References Cited

U.S. PATENT DOCUMENTS

| | | | |
|---|---|---|---|
| 2009/0325703 A1* | 12/2009 | Suzuki | A63F 13/02 463/37 |
| 2012/0062588 A1* | 3/2012 | Sato | G06T 3/0006 345/611 |
| 2015/0199817 A1* | 7/2015 | Ishimaru | G01S 5/16 382/103 |

FOREIGN PATENT DOCUMENTS

| | | |
|---|---|---|
| JP | 2010-152870 | 7/2010 |
| JP | 2013-078433 | 5/2013 |
| JP | 2013-156038 | 8/2013 |
| JP | 2014-095624 | 5/2014 |
| JP | 2014-186567 | 10/2014 |
| WO | 00/57129 | 9/2000 |
| WO | 2007/050885 | 5/2007 |

OTHER PUBLICATIONS

Tojiro Kaneko, et. al., "Recognition of an Object Using Three-Dimensional Point Groups," study group materials of IEEJ, System, Japan, The Institute of Electrical Engineers of Japan, Sep. 25, 2013, pp. 7-12.

* cited by examiner

FIG. 8
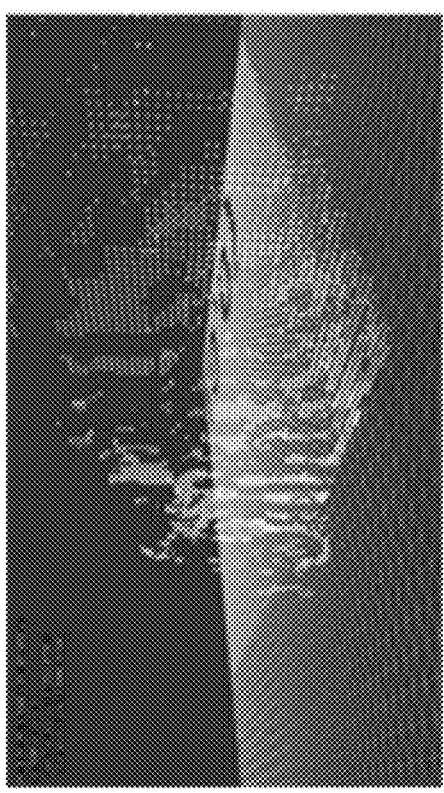
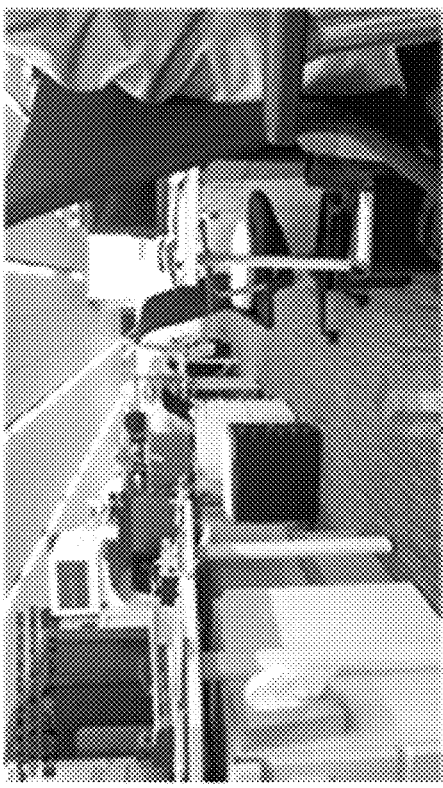

FIG. 13
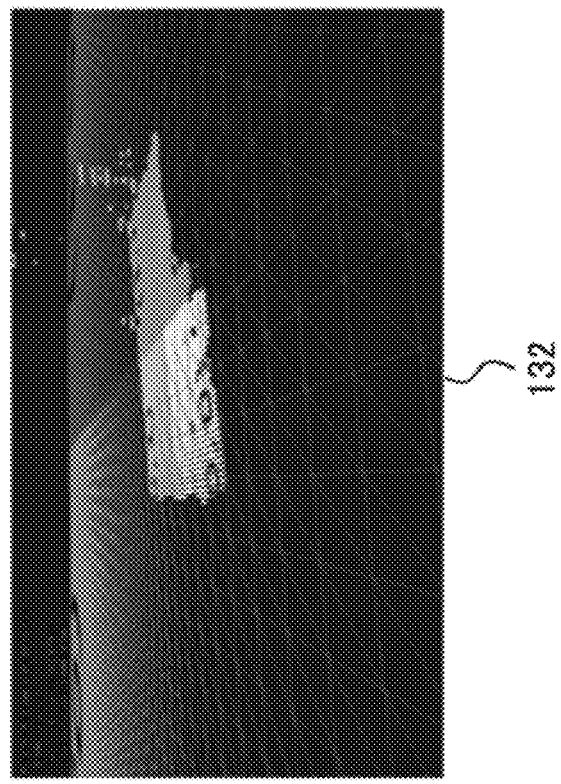
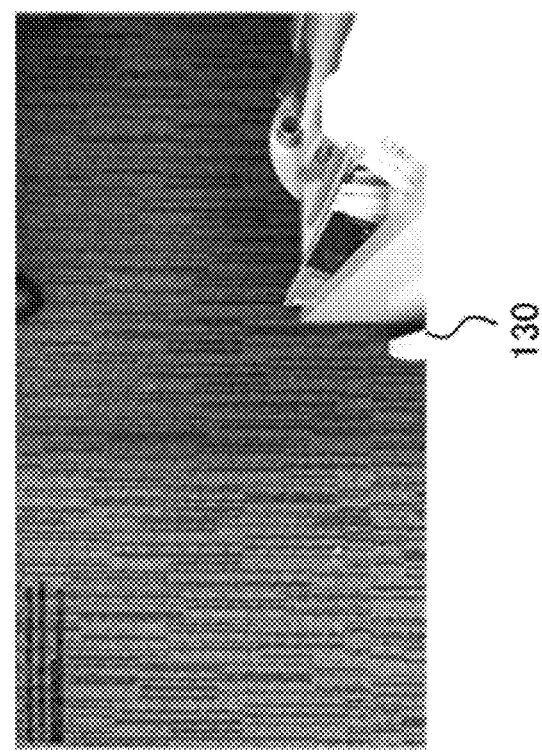

INFORMATION PROCESSING DEVICE, INFORMATION PROCESSING METHOD, AND COMPUTER PROGRAM

BACKGROUND

The present disclosure relates to an information processing device that executes processing on the basis of a shot image, an information processing method carried out by the information processing device, and computer program.

In recent years, it has been becoming common to equip a personal computer, a game machine, etc. with a camera and shoot a figure of a user to use the shot image in various forms. For example, systems to transmit an image of a user to the other side as it is via a network, such as a video phone and a video chat, and systems to recognize the motion of a user by image analysis and use the recognized motion as input information for a game or information processing have been put into practical use (refer to e.g. WO 2007/050885 A2 bulletin). Moreover, in recent years, it has been becoming possible to realize games and image expression with a more realistic feeling by accurately detecting the motion of a target object in a three-dimensional space including the depth direction.

SUMMARY

Various problems exist in shooting a space in which a wide variety of objects exists to determine only a desired target object from the shot image and track the motion of the desired target object. For example, in a general position detection technique using a stereo image method or infrared reflection, images in a shot image are captured as collections of discrete points and the positions of them in a three-dimensional space are acquired. Therefore, in some cases, it is difficult to accurately acquire geometric, structural information such as information on which direction and what positional relationship an objects exist in. This often results in failure in acquisition of sufficient accuracy to execute information processing according to the motion of a person in contact with a floor or a wall or implement augmented reality (AR), in which image processing is so carried out that a three-dimensional object rendered by computer graphics appears to exist on a floor or a table as an actually-shot image.

There is a need for the present disclosure to provide a technique by which position detection of a target object in a three-dimensional space can be carried out with high accuracy.

According to an embodiment of the present disclosure, there is provided an information processing device that detects a position of a subject shot by a camera in a three-dimensional space. This information processing device includes a depth image acquiring section configured to acquire a depth image in which distance of a subject in depth direction from the camera is represented as a pixel value on an image plane, a spatial structure identifying section configured to identify a position of a plane forming a predetermined angle with a gravity vector among subject surfaces by detecting a coordinate point collection representing the plane on a basis of distribution of coordinate points obtained by inverse projection of pixels of the depth image to the three-dimensional space based on direction of the gravity vector, and a target object extracting section configured to generate and output position information of a predetermined target object on a basis of the position of the plane.

According to another embodiment of the present disclosure, there is provided an information processing method in which an information processing device detects a position of a subject shot by a camera in a three-dimensional space. This information processing method includes acquiring a depth image in which distance of a subject in depth direction from the camera is represented as a pixel value on an image plane and storing the depth image in a memory, identifying a position of a plane forming a predetermined angle with a gravity vector among subject surfaces by detecting a coordinate point collection representing the plane on a basis of distribution of coordinate points obtained by inverse projection of pixels of the depth image read from the memory to the three-dimensional space based on direction of the gravity vector, and generating and outputting position information of a predetermined target object on a basis of the position of the plane.

According to further another embodiment of the present disclosure, there is provided a computer program that causes a computer to implement detecting a position of a subject shot by a camera in a three-dimensional space. The computer program causing the computer to implement a configuration includes: acquiring a depth image in which distance of a subject in depth direction from the camera is represented as a pixel value on an image plane; identifying a position of a plane forming a predetermined angle with a gravity vector among subject surfaces by detecting a coordinate point collection representing the plane on a basis of distribution of coordinate points obtained by inverse projection of pixels of the depth image to the three-dimensional space based on direction of the gravity vector; and generating and outputting position information of a predetermined target object on a basis of the position of the plane.

What are obtained by translating arbitrary combinations of the above constituent elements and expressions of the present disclosure among method, device, system, computer program, recording medium in which a computer program is recorded, and so forth are also effective as embodiments of the present disclosure.

According to the embodiments of the present disclosure, information processing based on the position and motion of a target object in a shot image can be implemented with high accuracy.

BRIEF DESCRIPTION OF THE DRAWINGS

FIG. 8 is a diagram that exemplifies a state of coordinate points actually plotted in the embodiment;

FIG. 13 is a diagram showing a shot image and the distribution of coordinate points in a state in which a camera is oriented substantially vertically downward in the embodiment;

DETAILED DESCRIPTION OF THE PREFERRED EMBODIMENT

Figure 1:
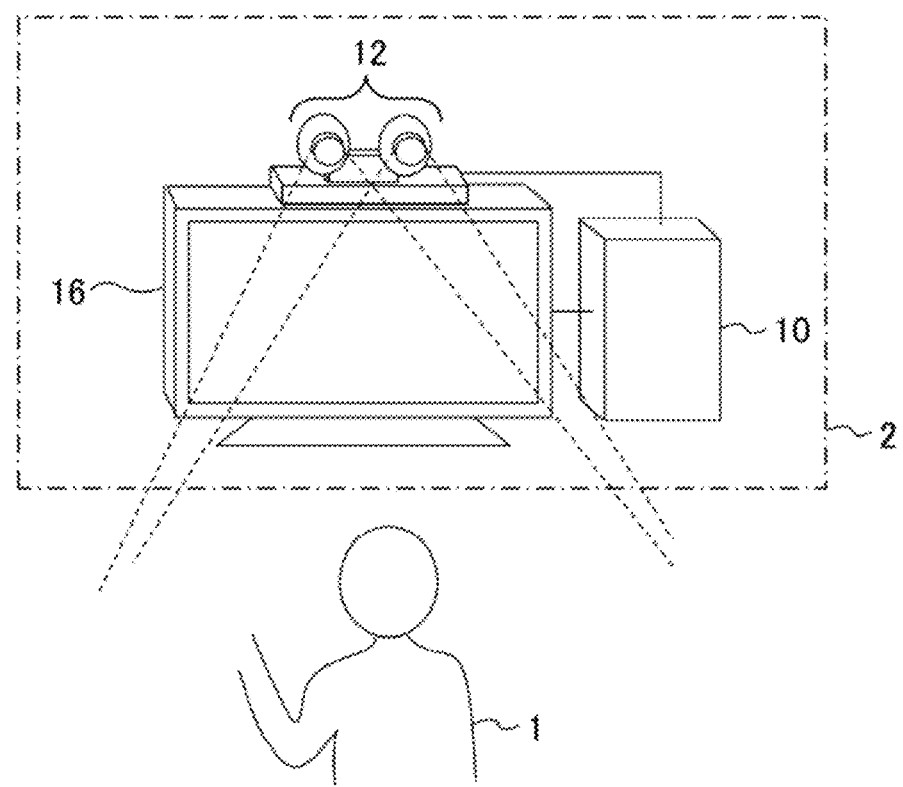
FIG. 1 is a diagram showing a configuration example of an information processing system to which an embodiment of the present disclosure can be applied.

FIG. 1 shows a configuration example of an information processing system to which an embodiment of the present disclosure can be applied. An information processing system 2 includes an imaging device 12 equipped with two cameras to shoot a target object such as a user 1, an information processing device 10 that executes information processing according to a request by the user on the basis of a shot image, and a display device 16 that outputs image data obtained as a result of the processing by the information processing device 10. The information processing device 10 may be connectable to a network such as the Internet.

The information processing device 10, the imaging device 12, and the display device 16 may be connected by wired cables or may be wirelessly connected by a wireless local area network (LAN) or the like. Any two or all of the imaging device 12, the information processing device 10, and the display device 16 may be combined to be integrally installed. Furthermore, the imaging device 12 does not necessarily need to be set on the display device 16. Moreover, the number and kinds of subjects are not limited.

The imaging device 12 has a configuration in which two digital video cameras each including imaging elements of a charge coupled device (CCD), a complementary metal oxide semiconductor (CMOS), or the like are disposed as left and right cameras at a known internal. The two digital video cameras each shoot a subject existing in the same space from the left and right positions at a predetermined frame rate. Hereinafter, a pair of frames shot in this manner will be referred to also as "stereo images."

The information processing device 10 detects the position of a subject in a three-dimensional space including the image plane and the depth direction from the cameras. The detection result is utilized for processing at subsequent stages where the position and motion of a subject are used as input information. For example, the detection result is used to implement augmented reality (AR) in which a virtual object that reacts to the motion of arms and legs of the user 1 as a subject is rendered on a shot image. Alternatively, the motion of the user 1 may be tracked to be reflected in an image of a game or converted to command input of information processing. As above, the use purpose of the information relating to the position of a subject obtained in the present embodiment is not particularly limited.

The display device 16 displays the result of processing executed by the information processing device 10 as an image according to need. The display device 16 may be a television having a display to output images and a speaker to output sounds and is e.g. a liquid crystal television, a plasma television, or a PC display. As described above, the contents of processing finally executed by the information processing device 10 and the image that should be displayed are not particularly limited depending on the use purpose thereof. Therefore, hereinafter, the description will be made with focus on processing of position detection of a subject executed by the information processing device 10.

Figure 2:
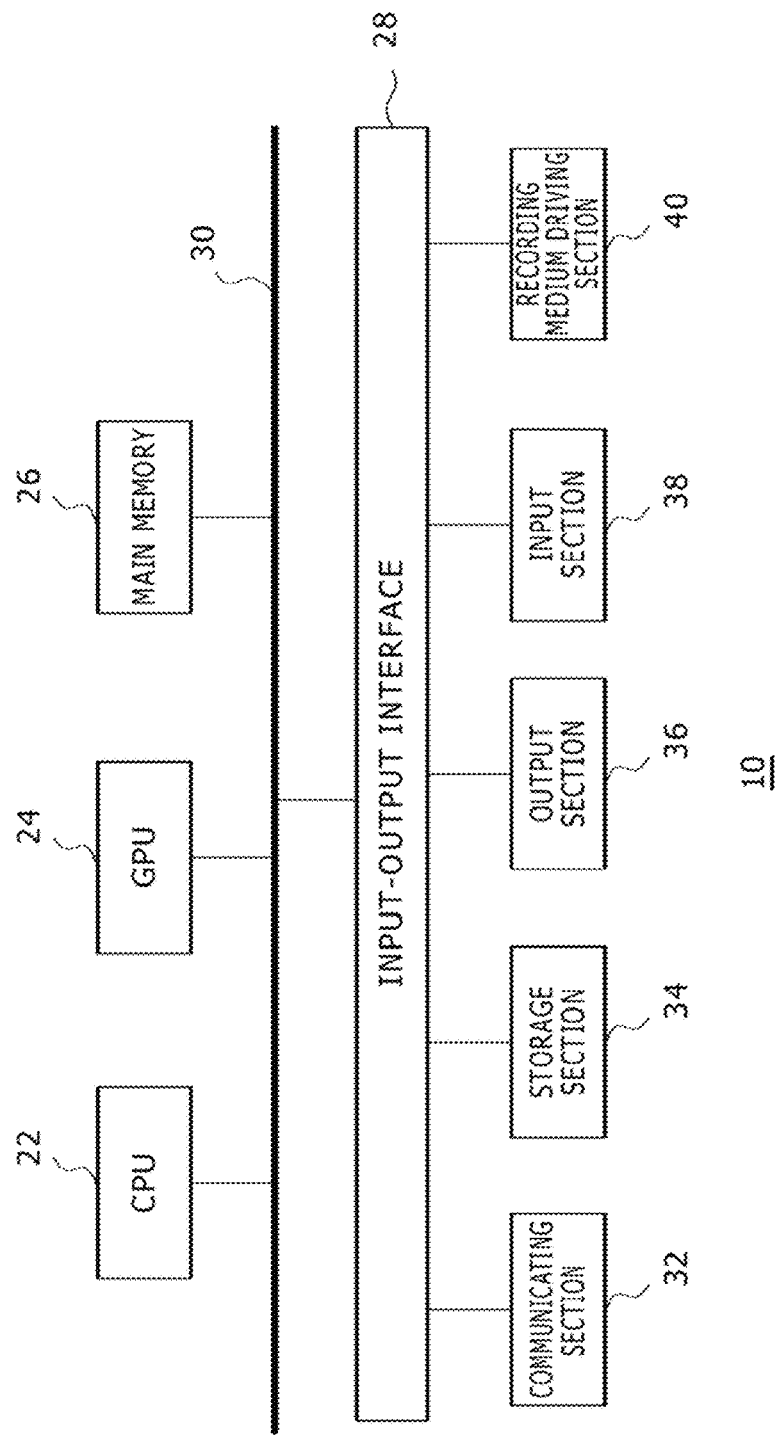
FIG. 2 is a diagram showing the internal circuit configuration of an information processing device in the embodiment.

FIG. 2 shows the internal circuit configuration of the information processing device 10. The information processing device 10 includes a central processing unit (CPU) 22, a graphics processing unit (GPU) 24, and a main memory 26. The CPU 22 controls processing and signal transmission in constituent elements inside the information processing device 10 on the basis of programs such as an operating system and applications. The GPU 24 executes image processing. The main memory 26 is formed of a random access memory (RAM) and stores programs and data for processing.

These sections are mutually connected via a bus 30. Furthermore, an input-output interface 28 is connected to the bus 30. To the input-output interface 28, the following sections are connected: a communicating section 32 formed of peripheral apparatus interfaces of universal serial bus (USB), IEEE 1394, etc. and network interfaces of wired and wireless LANs; a storage section 34 such as a hard disk drive or a non-volatile memory; an output section 36 that outputs data to output devices such as the display device 16 and a speaker; an input section 38 to which data are input from input devices such as a keyboard, a mouse, the imaging device 12, and a microphone; and a recording medium driving section 40 that drives a removable recording medium such as a magnetic disc, an optical disc, or a semiconductor memory.

The CPU 22 carries out overall control of the information processing device 10 by executing the operating system stored in the storage section 34. Furthermore, the CPU 22 executes various kinds of programs read out from a removable recording medium to be loaded into the main memory 26 or downloaded via the communicating section 32. The GPU 24 has functions of a geometry engine and functions of a rendering processor. The GPU 24 executes rendering processing in accordance with a rendering command from the CPU 22 and stores a display image in a frame buffer (not shown). Then, the GPU 24 converts the display image stored in the frame buffer to a video signal and outputs it to the output section 36 and so forth.

Figure 3:
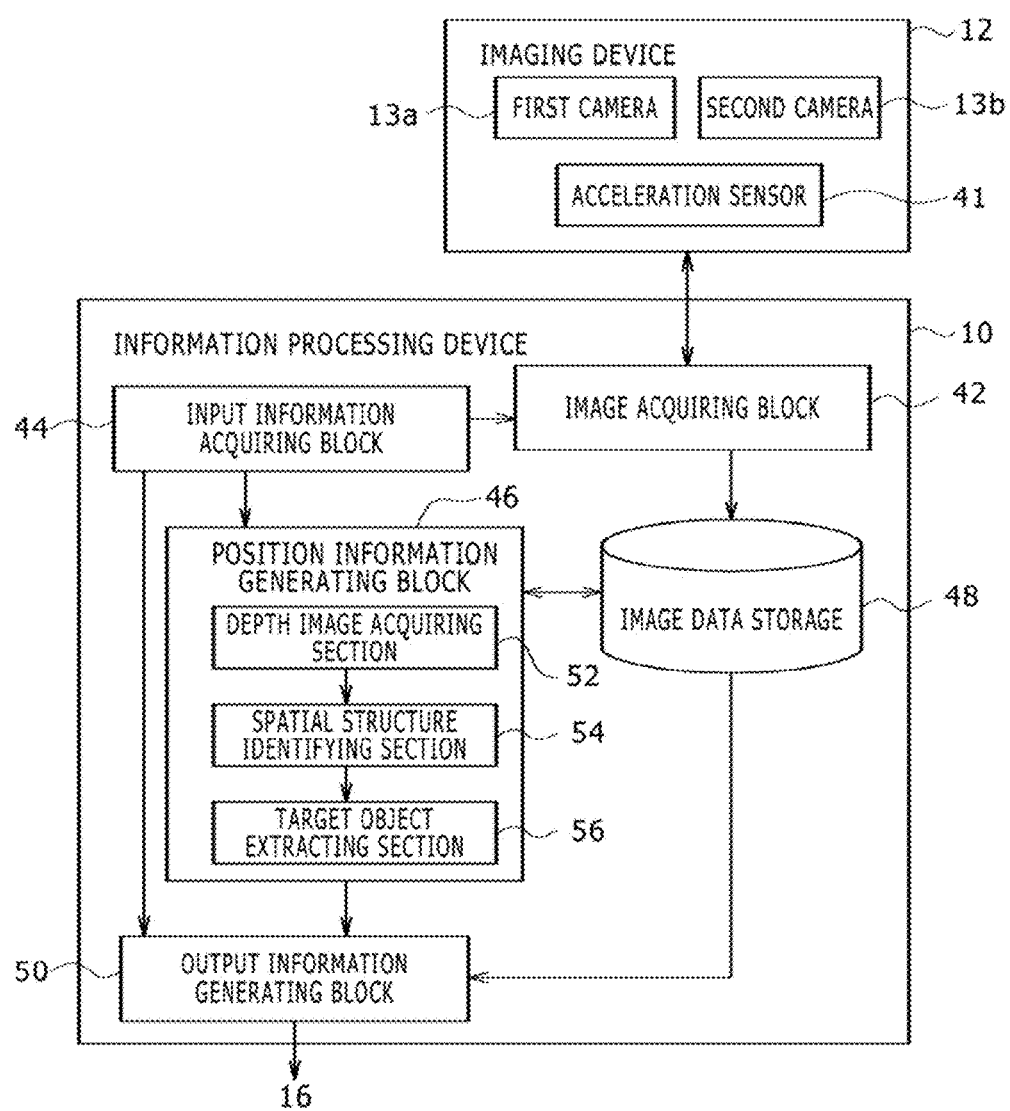
FIG. 3 is a diagram showing the configuration of functional blocks of an imaging device and the information processing device in the embodiment.

FIG. 3 shows the configuration of functional blocks in the imaging device 12 and the information processing device 10. In terms of hardware, the respective functional blocks shown in FIG. 3 and FIG. 9 to be described later can be implemented by configurations such as the CPU, the GPU, the RAM, and the various kinds of processors shown in FIG. 2. In terms of software, they are implemented by programs to exert functions such as data input function, data holding function, image analysis function, and rendering function. Therefore, it is to be understood by those skilled in the art that these functional blocks can be implemented in various forms by only hardware, only software, or a combination of them, and these functional blocks are not limited to any one of the forms.

The imaging device 12 includes a first camera 13a and a second camera 13b. The respective cameras each shoot a subject at a predetermined frame rate from left and right positions separate by a known distance. Stereo images obtained by the shooting are transmitted to the information processing device 10 as needed by a general method based on a request from the information processing device 10. The imaging device 12 further includes an acceleration sensor 41 that measures the gravity acceleration. On the basis of information output from the acceleration sensor 41, the inclination of the imaging device 12 with respect to the vertical direction in a real space and hence the angle relationship between an image represented by a shot image and a horizontal plane in the real space are identified.

The information processing device 10 includes the following blocks: an image acquiring block 42 that acquires stereo images from the imaging device 12; an input information acquiring block 44 that acquires instruction input from a user; a position information generating block 46 that generates position information of a target object on the basis of a shot image; an output information generating block 50 that executes processing as appropriate on the basis of the position of a target object and generates output information; and an image data storage 48 that stores stereo images input from the imaging device 12 and various kinds of interim data such as a depth image acquired by the position information generating block 46.

The input information acquiring block 44 accepts the start and end of processing and instruction input from a user by a measure other than shooting by the imaging device 12, and transmits a processing request signal according to the accepted input to other functional blocks. The input information acquiring block 44 is implemented through cooperation of general input devices such as button, keyboard, mouse, trackball, and touch panel, the CPU 22 that interprets the contents of operation made to these input devices and generates the processing request signal, and so forth.

The image acquiring block 42 acquires image data of stereo images and so forth from the imaging device 12 in accordance with a request from the input information acquiring block 44 and stores the image data in the image data storage 48. The acquired images may be various ones depending on processing to be executed by the output information generating block 50 at a subsequent stage and information to be output. For example, the following form is available. Specifically, the image acquiring block 42 acquires only an image shot by the first camera 13a at a frame rate at the time of the shooting and acquires, at a rate, i.e. a frequency, lower than it, stereo images shot by the first camera 13a and the second camera 13b. That is, the acquisition rates of the image shot by the first camera 13a and the image shot by the second camera 13b may be allowed to be independently set.

The image acquiring block 42 further acquires a measurement result of the gravity acceleration by the acceleration sensor 41 in addition to the data of stereo images and stores it in the image data storage 48. The image acquiring block 42 is implemented through cooperation of the input section 38, the input-output interface 28, the CPU 22, and so forth shown in FIG. 2.

The position information generating block 46 is implemented by the CPU 22, the GPU 24, and so forth shown in FIG. 2 and detects the positions of subjects in a three-dimensional space on the basis of the data of stereo images stored in the image data storage 48. The position information generating block 46 includes a depth image acquiring section 52, a spatial structure identifying section 54, and a target object extracting section 56. The depth image acquiring section 52 generates a depth image representing the position distribution in the depth direction about subjects existing in the field of view of the imaging device 12 by using stereo images. The position distribution of the subjects in the depth direction is obtained by a general technique such as a stereo image method. The stereo image method is a general method in which positions at which the same subject is captured in the left and right images as stereo images are identified and the distance of this subject from the imaging device 12 is calculated from the disparity between the positions.

Furthermore, the depth image is an image in which the distance of each subject from the imaging device 12 in the depth direction is represented as a pixel value on the shot-image plane. Therefore, in the depth image, the positions, in the depth direction, of various kinds of objects existing in a shooting-target space, such as floor, table, wall, ceiling, and furniture, besides main subjects such as a person are represented with the shapes of images of the objects. The imaging device 12 may be provided with a function to generate the depth image. In this case, the image acquiring block 42 acquires data of a depth image from the imaging device 12 and stores it in the image data storage 48, and the depth image acquiring section 52 reads out it.

The method for detecting the positions of subjects in the depth direction is not limited to the stereo image method. For example, the position distribution of subjects in the depth direction may be acquired by providing the imaging device 12 with an infrared sensor, a camera of a reference light irradiation type, or the like and analyzing the reflection time and so forth of an infrared ray or reference light with which a subject is irradiated, and a depth image may be generated on the basis of the position distribution. In either case, the depth image acquiring section 52 supplies the generated or acquired depth image to the spatial structure identifying section 54. Alternatively, the depth image acquiring section 52 stores the depth image in the image data storage 48 and notifies the spatial structure identifying section 54 of identification information of data thereof.

The spatial structure identifying section 54 identifies objects configuring horizontal planes in a real space, such as floor, table upper surface, and ceiling, among subjects as information represented by a depth image. Specifically, the spatial structure identifying section 54 plots each pixel in the depth image as a coordinate point in a virtual three-dimensional space on the basis of three-dimensional position information represented by a pixel value. At this time, the spatial structure identifying section 54 makes horizontal planes in the three-dimensional space correspond with actual horizontal planes on the basis of the gravity direction measured by the acceleration sensor 41 of the imaging device 12. Then, on the basis of the distribution of the coordinate points in this three-dimensional space in the gravity vector direction, the spatial structure identifying section 54 extracts coordinate points configuring the surfaces of objects that each provide a horizontal part and identifies the positions and inclinations of these horizontal surfaces in the field of view of the imaging device 12. Hereinafter, the surface of an object that provides a horizontal part will be referred to as a "horizontal object" and be distinguished from a "horizontal plane" representing a two-dimensional space perpendicular to the gravity direction.

Where images of horizontal objects such as floor and table upper surface exist in a shot image is important information to fuse a rendered three-dimensional object with a real world in implementing AR. That is, when the place where the three-dimensional object walks or comes flying corresponds with an actual horizontal object at a higher degree, an image with a more realistic feeling as if the object were actually present there is obtained. Furthermore, these pieces of information are useful also in a mode in which information processing according to the motion of e.g. a person's leg or arm is executed. Specifically, accurate tracking of only the motion of a person is allowed by separating a floor and feet existing on it, or a table and a hand put on it, etc. which are difficult to distinguish from each other due to the continuation of images thereof, by using the position information of the floor or the table. Details of the processing of the spatial structure identifying section 54 will be described later.

The target object extracting section 56 extracts the position information of a target object according to the purpose of the information processing. In the above-described example, in the case of rendering the three-dimensional object that comes flying onto the table, the position information of the table upper surface is extracted among the pieces of information identified by the spatial structure identifying section 54. In the case of displaying an image in which a user kicks a virtual ball and walks in a virtual world from the motion of the legs of the user standing on the floor, the position information of only the legs separated from the floor surface is extracted. As described above, by excluding the pixels representing the floor from the legs and the floor obtained as continuous images in a depth image, recognition of even the subtle motion of the toes is also enabled. As above, the target extracted by the target object extracting section 56 may be any of the horizontal objects identified by the spatial structure identifying section 54 or may be an object left after exclusion of the relevant horizontal object. The extracted position information is stored in the image data storage 48 or directly supplied to the output information generating block 50.

The output information generating block 50 is implemented by the CPU 22, the GPU 24, and so forth shown in FIG. 2 and executes processing according to the use purpose as appropriate, such as further rendering processing on a shot image read out from the image data storage 48, on the basis of the information relating to the position of the target object, generated by the position information generating block 46. The processing executed here is not particularly limited as described above and may be switched as appropriate according to an instruction from a user accepted by the input information acquiring block 44, an executed program, and so forth. The data of the image obtained as the result of the processing is output to the display device 16 to be displayed. Alternatively, the data may be transmitted to another device via a network. The output information generating block 50 may further generate audio data according to the motion of a subject and make sounds be output from a speaker.

Figure 4:
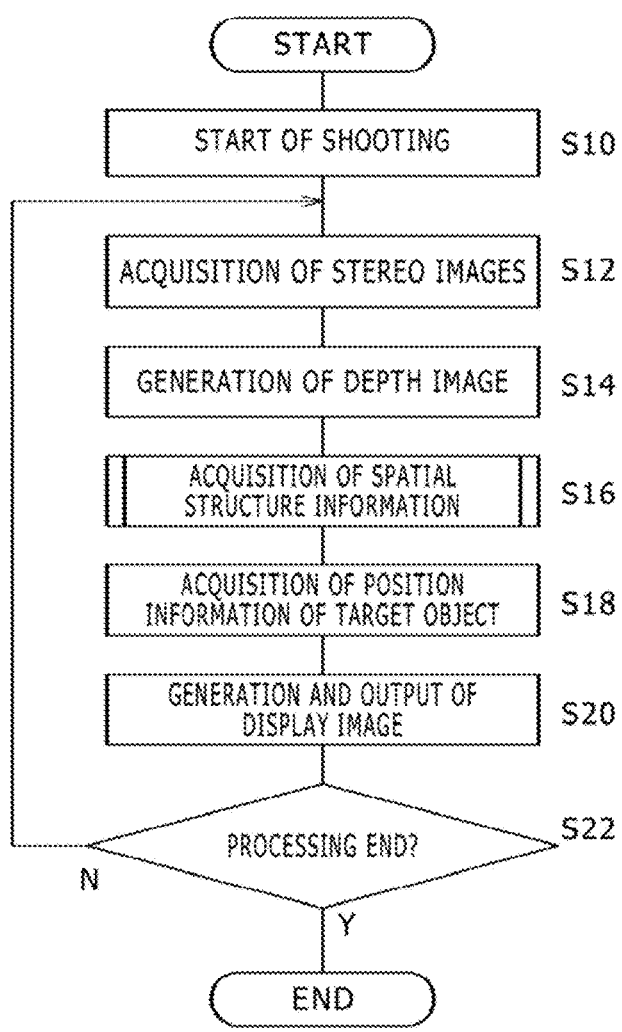
FIG. 4 is a flowchart showing the basic procedure of information processing executed by the information processing system in the embodiment.

Next, the operation of the information processing system implemented by the above-described configuration will be described. FIG. 4 is a flowchart showing the basic procedure of information processing executed by the information processing system 2. First, when a user instructs the input information acquiring block 44 of the information processing device 10 to start the processing, the imaging device 12 starts shooting of subjects on the basis of a shooting start request via the image acquiring block 42 (S10). The image acquiring block 42 of the information processing device 10 sequentially acquires frame data of a moving image shot through this step and stores the frame data in the image data storage 48 (S12). In this data, data of stereo images and data relating the direction of the gravity vector are included at a predetermined rate.

Next, the depth image acquiring section 52 of the position information generating block 46 generates a depth image in which the position distribution of the subjects in the depth direction is represented as pixel values by using the data of stereo images stored in the image data storage 48 (S14). If the imaging device 12 includes a function to generate the depth image as described above, the data of this depth image is stored in the image data storage 48 and thus this data is read out instead of generating the depth image in S14. Next, the spatial structure identifying section 54 of the position information generating block 46 acquires position information of actual horizontal objects such as floor and table by identifying coordinate points configuring the horizontal objects among the coordinate points represented by the depth image (S16). Because the horizontal objects such as floor, table, and ceiling are objects that define the horizontal planes in the real space and determine the rough structure of the subject space, the position information of them is represented as the "spatial structure information" in the flowchart of FIG. 4.

Next, the target object extracting section 56 of the position information generating block 46 acquires the position information of a target object for generation of a display image on the basis of the position information of the horizontal objects obtained by the processing of S16 (S18). As described above, the target object may be the horizontal object itself, such as a floor or a table, or may be part of a person's body, such as a hand or a foot, obtained by separating a floor, a table, or the like. The output information generating block 50 executes image modification processing, image analysis processing, or the like according to the use purpose on the basis of the position information of the target object in the three-dimensional space, and generates and outputs a display image representing the processing result according to need (S20).

The information processing system 2 continues to output a moving image or the like corresponding to the position and motion of the target object by repeating the processing of S12 to S20 at a predetermined rate until the user issues an instruction to end the processing (N of S22), and ends all processing in response to the instruction to end the processing (Y of S22). The display image output processing of S20 may be executed at a cycle independent of the position detection processing from S12 to S18. For example, the display image may be output at a rate equivalent to the frame rate of a moving image shot by the imaging device 12 and the position detection processing may be executed at a rate lower than the output rate. Furthermore, the cycle may be different also between the acquisition processing of the spatial structure information in S16 and the acquisition processing of the position information of the target object in S18. For example, in a situation in which the imaging device 12 is fixed and horizontal objects are also immobile obviously, it is also possible that the processing of S16 is executed only once at an early stage.

Figure 5:
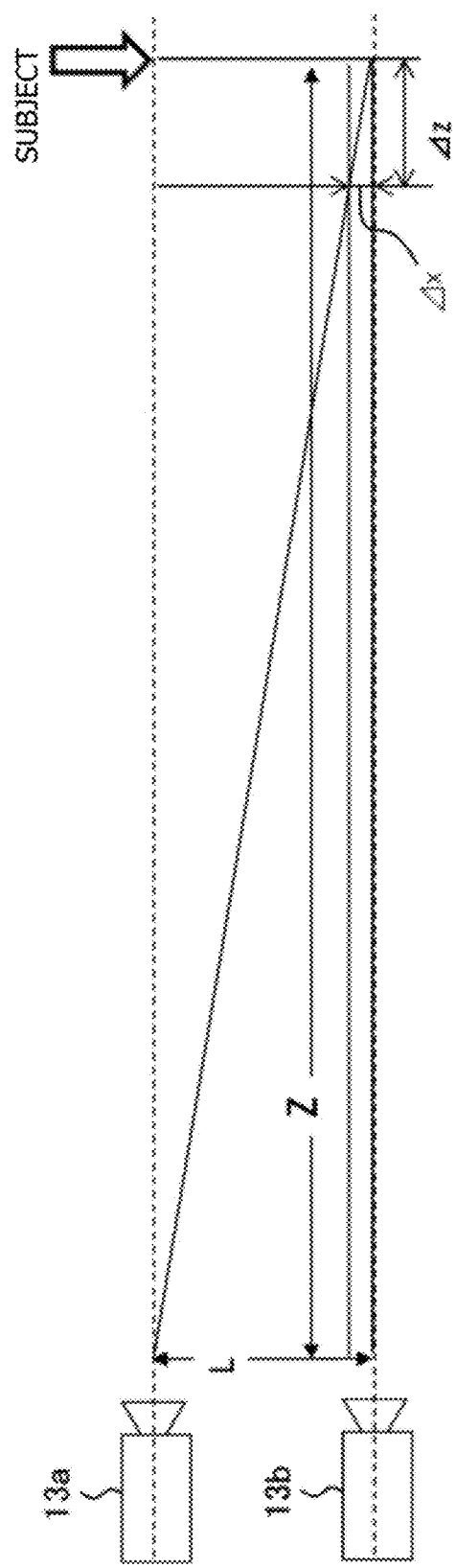
FIG. 5 is a diagram for explaining the relationship between the disparity in stereo images and the position of a subject in the depth direction, used in the embodiment.

Next, the depth image generated by the depth image acquiring section 52 will be explained. Suppose that here the units of length are unified to the meter or the like unless stated. FIG. 5 is a diagram for explaining the relationship between the disparity in stereo images and the position of a subject in the depth direction. The first camera 13a and the second camera 13b are so set as to have parallel optical axes separate from each other by distance L. Suppose that the subject exists at a position of the right-end arrow separate from such stereo cameras by distance Z in the depth direction.

A width Δx in the real space represented by one pixel of images shot by the respective cameras is proportional to the distance Z and expressed as follows.

$$\Delta x = Z \times w / W \qquad (1)$$

In this expression, W denotes the number of pixels of the cameras in the horizontal direction. w denotes the range of the field of view of the real space in the horizontal direction when the distance Z is one. It is determined by the angle of sight.

The same subject shot by the two cameras separate by the distance L has, on the images thereof, disparity D (pixels) in terms of the number of pixels, expressed below substantially.

$$D = L/\Delta x = L \times (W/w) \times (1/Z) = C/Z \qquad (2)$$

In this expression, C is a value determined by the cameras and setting thereof and can be regarded as a constant in operation.

If the disparity D is obtained by e.g. performing block matching for each of regions with a predetermined size in units of several pixels in the left and right shot images as stereo images, the distance Z of the subject corresponding to the image in the depth direction is obtained for each of these minute regions based on expression (2). That is, the depth image is acquired as an image in which the depth-direction distance Z of a subject whose image is represented at position coordinates (X, Y) in either the left or right shot image is represented as the pixel value of the position coordinates.

Figure 6:
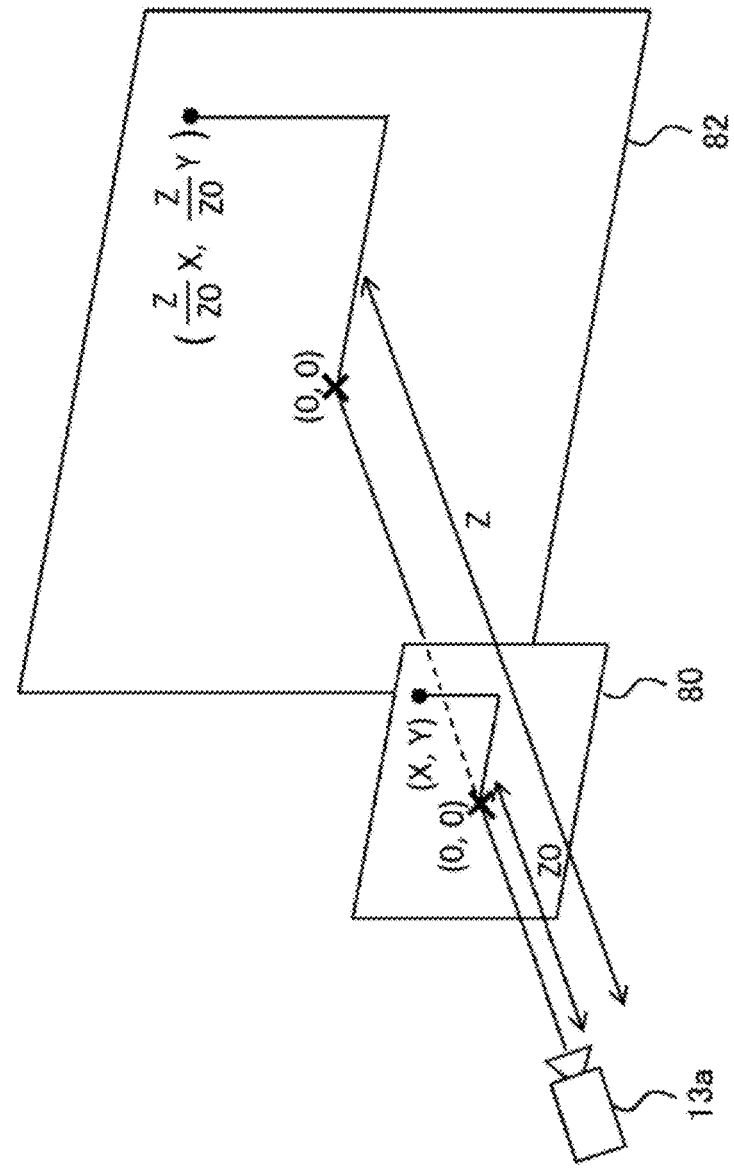
FIG. 6 is a diagram schematically showing the relationship between a pixel in a depth image and a coordinate point in a world coordinate system, used in the embodiment.

In the present embodiment, the position information possessed by this depth image is represented as coordinate points in a three-dimensional space and the positions of horizontal objects are identified by using it. For this purpose, the depth image is subjected to inverse projective transformation to a three-dimensional world coordinate system on the basis of the field of view of the camera. FIG. 6 schematically shows the relationship between the pixel in the depth image and the coordinate point in the world coordinate system.

Here, suppose that a depth image 80 is created regarding the field of view of the first camera 13a. As shown in the diagram, assuming that the pixel value of the position coordinates (X, Y) is Z when the center of the depth image 80 intersecting the optical axis of the first camera 13a is defined as the origin, the position of the image represented by the pixel in the world coordinate system, i.e. the position coordinates thereof on a plane 82 whose distance from the first camera 13a is Z, are ((Z/Z0)X, (Z/Z0)Y). In this manner, the information (X, Y, Z) represented by each pixel in the depth image can be transformed to the coordinate point in the three-dimensional world coordinate system.

Here, Z0 is a constant determined by the field of view of the camera. By setting Z0 to the value unique to the first camera 13a, the world coordinate system can be made to correspond with the real space. However, when the three-dimensional space of ((Z/Z0)X, (Z/Z0)Y, Z) by the above-described coordinate transformation is used as it is, the correspondence with the horizontal plane in the real space is not prescribed. That is, the distribution of the coordinate points is not affected even when the orientation of the camera changes.

Figure 7:
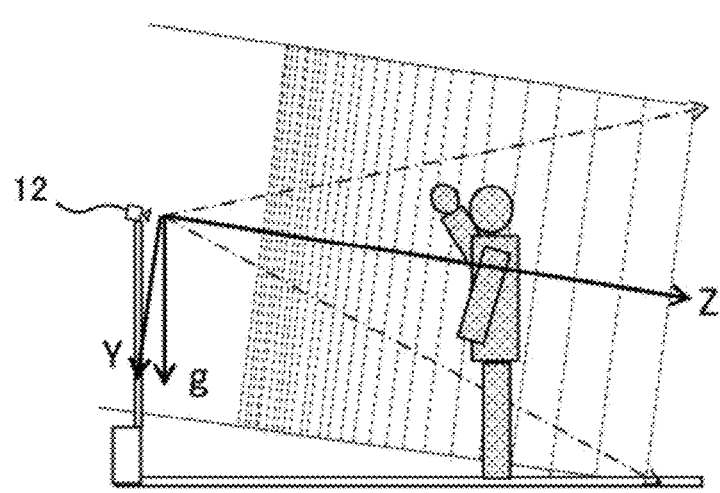
FIG. 7 is a diagram for explaining the relationship between the world coordinate system in which coordinate points are defined in the embodiment and an actual shooting space.

FIG. 7 is a diagram for explaining the relationship between the world coordinate system in which coordinate points are defined and an actual shooting space and shows a state when the shooting space is viewed from the right side. In the example of FIG. 7, the imaging device 12 is shooting subjects such as a person and its optical axis is oriented toward the lower side relative to the horizontal plane. In this case, the distance Z from the camera also has a downward axis as shown in the diagram and therefore does not correspond with the horizontal plane of the real space. Such a situation occurs depending on the placement conditions of the imaging device 12 and possibly constantly occurs in a mode in which a user holds the camera and shoots subjects from free directions.

Therefore, in the present embodiment, additionally the direction of the gravity vector (in FIG. 7, represented as "g") is acquired and thereby the coordinate points are plotted in the three-dimensional space formed by the gravity vector g and the plane perpendicular thereto. Specifically, the angles formed by the axes of (X, Y, Z) represented by the depth image and the gravity vector g are identified on the basis of an output value from the acceleration sensor 41 of the imaging device 12, and the position coordinates after the above-described coordinate transformation are further subjected to coordinate transformation. Then, in the axis direction of the gravity vector g, the distribution of the coordinate points in the plane perpendicular to the axis direction, i.e. in the horizontal plane, is searched. Therefore, coordinate points forming horizontal objects are extracted.

FIG. 8 exemplifies a state of coordinate points actually plotted in this manner. The left side in FIG. 8 is a shot image 84 by the first camera 13a. An image 86 shows a state obtained by viewing, substantially from the right front side obliquely, the distribution of coordinate points created by inverse projection, to a three-dimensional space, of the pixels in a depth image generated by a stereo image method or the like by use of the shot image 84 and a shot image by the second camera 13b. As shown in the diagram, the coordinate points shown in the image 86 configure point collections representing the surfaces of the subjects captured in the shot image 84. Among them, the coordinate points configuring horizontal objects such as the floor and the table upper surfaces are identified and extracted on the basis of distribution when the three-dimensional space is divided along the horizontal direction.

Figure 9:
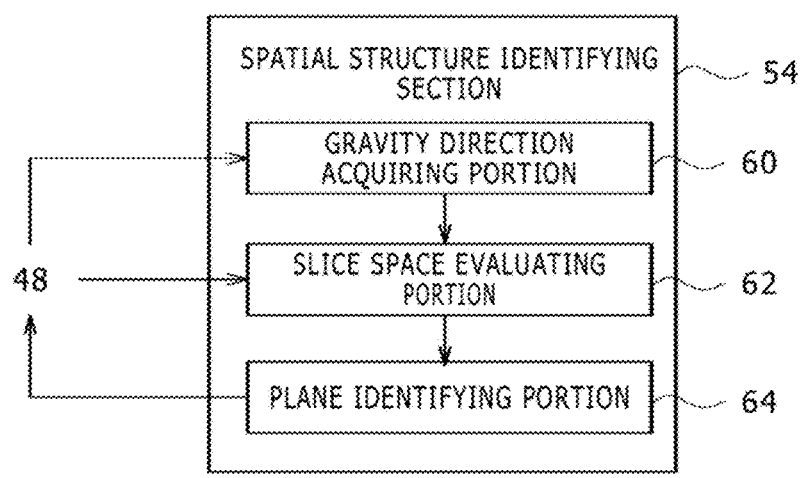
FIG. 9 is a diagram showing the detailed functional block configuration of a spatial structure identifying section in the embodiment.

FIG. 9 shows the detailed functional block configuration of the spatial structure identifying section 54. The spatial structure identifying section 54 includes a gravity direction acquiring portion 60, a slice space evaluating portion 62, and a plane identifying portion 64. The gravity direction acquiring portion 60 acquires the angle formed by the sensor surface of the imaging device 12 and the direction of the gravity vector g. As the data of the angle, data that is transmitted from the imaging device 12 and is stored in the image data storage 48 in association with data of stereo images is read out. However, the method for acquiring the angle is not limited thereto.

For example, the gravity direction acquiring portion 60 makes a shot image by the imaging device 12 be displayed on the display device 16 in real time and makes an arrow for specifying the correct direction of the gravity vector be displayed in a superimposed manner. A user operates an input device while viewing the shot image to change and settle the direction of the arrow on the shot image so that the arrow may accord with the actual gravity vector, i.e. the arrow may indicate the downward direction in the real space. The gravity direction acquiring portion 60 acquires the angle formed by the image plane and the gravity vector on the basis of the settled arrow direction. Alternatively, a situation in which a user drops an object in front of the imaging device 12 may be shot as a moving image and the gravity direction acquiring portion 60 may carry out image analysis of this moving image to thereby employ the direction in which the object drops in the image as the direction of the gravity vector.

The information on the acquired angle is notified to the slice space evaluating portion 62. The slice space evaluating portion 62 divides the three-dimensional space in which coordinate points are plotted by using a depth image as described above at predetermined intervals in such a manner that the sections are planes perpendicular to the axis of the gravity vector, i.e. horizontal planes in the real space, to generate plural divided spaces (hereinafter, referred to as "slice spaces"). When the interval between the dividing planes is shorter, the slice spaces become closer to planes. Therefore, qualitatively, it can be said that, when many coordinate points exist in such a thin space, this coordinate point collection represents a horizontal object. The slice space evaluating portion 62 evaluates the plural slice spaces from such a viewpoint on the basis of the number of coordinate points and so forth and extracts slice spaces including horizontal objects.

The plane identifying portion 64 uses the coordinate point collection belonging to the slice space extracted by the slice space evaluating portion 62 to accurately identify the position and orientation of a horizontal object formed by this coordinate point collection. Because the slice space is obtained by dividing the space perpendicularly to the axis of the gravity vector acquired by the gravity direction acquiring portion 60, the horizontal object is parallel to the section of the slice space in principle. On the other hand, irrespective of the method for acquiring the gravity vector, possibly the angle thereof will include some degree of error. Therefore, the slice space evaluating portion 62 optimizes the thickness of the slice space so that a coordinate point collection configuring a horizontal object may fall within one slice space even when the dividing plane of the slice space involves a minute inclination error. Then, the plane identifying portion 64 decides the correct position and angle of the horizontal object on the basis of the coordinate point collection belonging to the extracted slice space.

Figure 10:
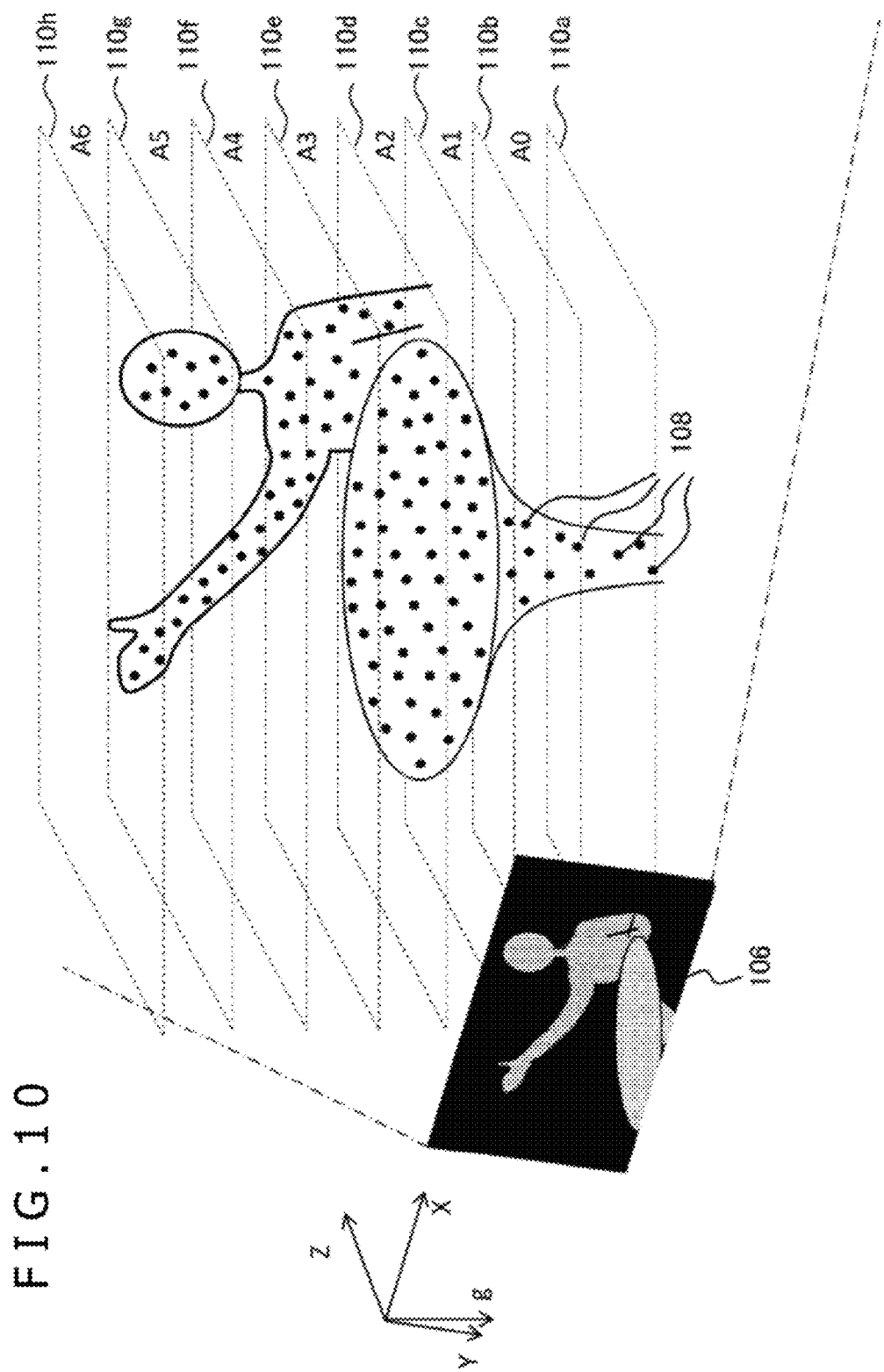
FIG. 10 is a diagram schematically showing how a slice space evaluating portion in the embodiment divides a three-dimensional space in which coordinate points are plotted to generate slice spaces.

FIG. 10 schematically shows how the slice space evaluating portion 62 divides a three-dimensional space in which coordinate points are plotted to generate slice spaces. In this diagram, a depth image 106 represents images of a table and a person, with the distance Z from the camera represented as the pixel value. A coordinate point collection 108 is obtained by plotting each pixel of the depth image 106 in the three-dimensional space by the above-described inverse projective transformation. At this time, the position coordinates of each coordinate point are acquired regarding the three-dimensional space formed by the gravity vector g and the plane perpendicular thereto as described above.

Such a three-dimensional space is divided by plural planes 110a to 110h perpendicular to the gravity vector g. This generates slice spaces A0 to A6. When the slice spaces are set excessively thin, there is a possibility that a coordinate point collection configuring one horizontal object is divided into another slice space attributed to an error in the angle of the gravity vector g and an error in the position coordinates of the coordinate point. On the other hand, when slice spaces are set excessively thick, the possibility that the coordinate points of an object other than the horizontal object are included in a slice space including a horizontal object becomes high. Therefore, the thickness of the slice spaces is optimized in advance according to the total number of coordinate points, the error range of the gravity vector g and the position coordinates of the coordinate point, the desired accuracy of the position identification, the use purpose of the image, and so forth.

Although the coordinate points and the slice space are schematically shown in FIG. 10, actually the number of coordinate points is on the order of several tens of thousands and slice spaces on the order of several hundred are generated for the coordinate points. Furthermore, the upper limit (plane 110h) and the lower limit (plane 110a) of the space to be divided are set to the positions of the coordinate points at the upper end and the lower end in the axis direction of the gravity vector g for example. Alternatively, it is also possible to derive the average position of all coordinate points and set the upper limit and the lower limit to positions separate from the average position by a predetermined distance such as one meter as the actual distance in the vertical direction. In the latter case, useless expansion of the space to be divided can be suppressed even when the position coordinates of the coordinate points involve an abnormal value.

Figure 11:
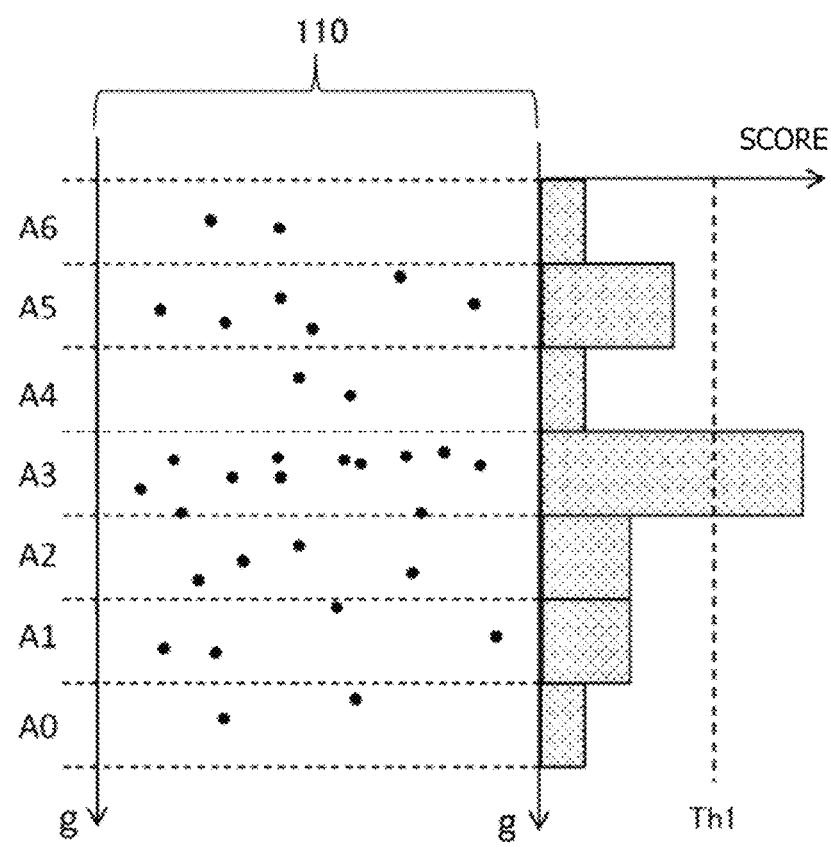
FIG. 11 is a diagram for explaining a method for extracting the slice space including a horizontal object by the slice space evaluating portion in the embodiment.

FIG. 11 is a diagram for explaining the method for extracting a slice space including a horizontal object by the slice space evaluating portion 62. The left side in this diagram is a distribution example 110 obtained when coordinate points in a three-dimensional space like those shown in FIG. 10 are viewed from the horizontal direction. The slice space evaluating portion 62 counts the coordinate points belonging to each of the slice spaces A0 to A6 and then gives a score to each slice space on the basis of the counted number according to a predetermined rule. A bar graph on the right side of FIG. 11 shows an example of the scores given to the respective slice spaces A0 to A6.

Most simply, the number of coordinate points is employed directly as the score. Alternatively, coordinate points closer to the camera are weighted by a higher coefficient and then the total of the weighted values is employed as the score. This is a calculation method that takes into consideration the fact that the position of a coordinate point closer to the camera is identified more accurately. Specifically, in the stereo image method, a shot image has data on each pixel basis and thus the disparity D is also obtained on each pixel basis. Referring again to FIG. 5, because the disparity is obtained in units of Δx in the real space, interval Δz at which the distance in the depth direction is obtained is expressed as follows.

$$\Delta z = \Delta x \times Z/L = Z^2 \times (w/W) \times (1/L) \quad (3)$$

That is, the resolution of the distance Z from the camera decreases in proportion to the square of the distance Z. Therefore, $1/Z^2$ is employed as a weighting coefficient and the score is calculated by the following expression.

$$Si = \sum_{n=0}^{Ni-1} \frac{1}{Z_n^2} \quad (4)$$

In this expression, Si denotes the score of the i-th slice space. Ni denotes the number of coordinate points belonging to this slice space. Zn denotes the value of the distance Z of the n-th coordinate point among these coordinate points from the camera. Employing this allows a coordinate point involving a smaller error in the position to have a larger contribution to the score, which can further improve the accuracy of detection of the horizontal object. However, the weighting is not limited thereto and 1/Z may be used as the weighting coefficient because the width Δx in the real space represented by one pixel is proportional to the distance Z. Depending on the shooting environments, the X-coordinate and the Y-coordinate of the coordinate point may be further used. Furthermore, in the case of acquiring the depth image by a method other than the stereo image method, such as a method with an infrared sensor, the method for calculating the score may be decided as appropriate according to the accuracy properties of the sensor used.

Then, the slice space evaluating portion 62 makes a threshold determination on the scores given in this manner by using a threshold Th1 set in advance, and extracts the slice space from which the score surpassing the threshold Th1 is obtained. In the example of FIG. 11, the slice space A3 is extracted. As the threshold Th1, a typical value may be set according to the total number of coordinate points and so forth. Besides, optimum values may be prepared according to the shooting environments such as indoor/outdoor environments, the assumed illuminance, and so forth and a value may be adaptively selected among them according to the actual situation.

For example, several thresholds may be prepared for typical combinations of the floor texture and the illuminance and a user may decide one threshold by selecting a combination close to the actual combination of the floor texture and the illuminance. In e.g. the case of playing a game in the same room under similar illuminance, the same threshold can be used. Therefore, after decision in the initial setting, the decided value may be employed.

In the case of detecting a floor, the threshold determination about the slice space is sequentially carried out in the direction from the slice space A0 to A6 in FIG. 11, i.e. in the opposite direction of the gravity vector g from the lower limit of the divided space, and the first slice space whose score surpasses the threshold is detected. After the floor is detected, it is ensured that horizontal objects other than the floor exist over the floor and therefore the search is further advanced upward to detect the slice space whose score surpasses the threshold. The threshold used at this time may be the same as that set to detect the floor or may be different.

Qualitatively, the magnitude of the error involved in the position of the coordinate point differs depending on the texture of the surface of an object. Therefore, for example, a user selects the material and so forth of an object that actually exists and sets a threshold according to the selection, which can make the detection accuracy higher. If a ceiling is included in the field of view, the threshold determination about the slice space may be sequentially carried out in the opposite direction to the direction of detecting the slice space including a floor surface, i.e. in the same direction as the gravity vector g like the direction from the slice space A6 to A0 in FIG. 11, and the first slice space whose score surpasses the threshold may be detected. By settling the search direction depending on the target object in this manner, the processing efficiency can be improved and what a detected horizontal object is can be estimated according to the position.

Figure 12:
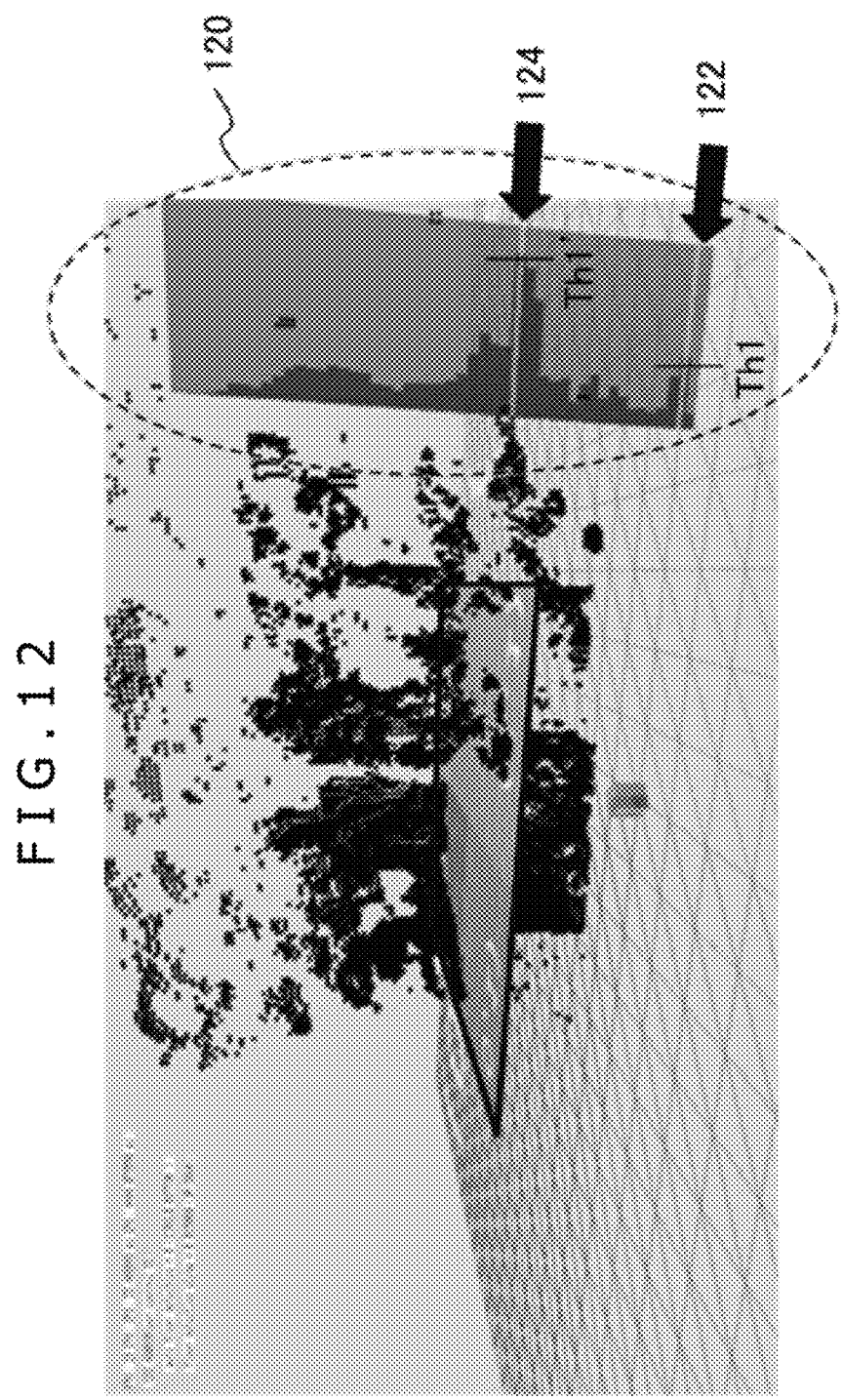
FIG. 12 is a diagram that exemplifies the distribution of actual coordinate points and the distribution of scores given about these coordinate points in the embodiment.

FIG. 12 exemplifies the distribution of actual coordinate points and the distribution of the score given about these coordinate points. In FIG. 12, black minute squares represent coordinate points plotted in a three-dimensional space and, in a region 120 surrounded by a dotted-line ellipse, the scores of slice spaces existing at corresponding positions in the three-dimensional space are shown by a bar graph. Each score is subjected to a threshold determination in the opposite direction of the gravity vector (from the bottom to the top in the diagram) as described above. At this time, first, by carrying out the threshold determination with the threshold Th1 set for a floor, a slice space is detected at a position of an arrow 122. Next, by continuing the threshold determination with a threshold Th1' set for a table, a slice space is detected at a position of an arrow 124. As a result, it can be estimated that a floor exists at the position of the arrow 122 and the upper surface of a table exists at the position of the arrow 124.

In the present embodiment, the horizontal plane in the real space can be constantly recognized by acquiring the angle of the gravity vector g. Therefore, whichever direction the camera of the imaging device 12 is oriented in, the slice space including a horizontal object can be extracted by a similar method. As an extreme example thereof, a consideration will be given to a case in which the camera is oriented vertically upward or vertically downward. FIG. 13 shows a shot image and the distribution of coordinate points in a state in which a camera is oriented substantially vertically downward.

In this example, the camera is oriented toward a floor and thus most part of a shot image 130 represents a pattern of the floor. In such a case, most part of a depth image has the same pixel value. Therefore, when the information of the depth image is plotted as coordinate points in a three-dimensional space, the coordinate points concentrate at one position with respect to the axis of the gravity vector g as in an image 132. This phenomenon occurs not only when the camera is oriented toward a floor but also when the camera is oriented toward the upper surface of a table on which objects are hardly put or a ceiling. In such a case, the score is also remarkably high with a certain slice space.

Figure 14:
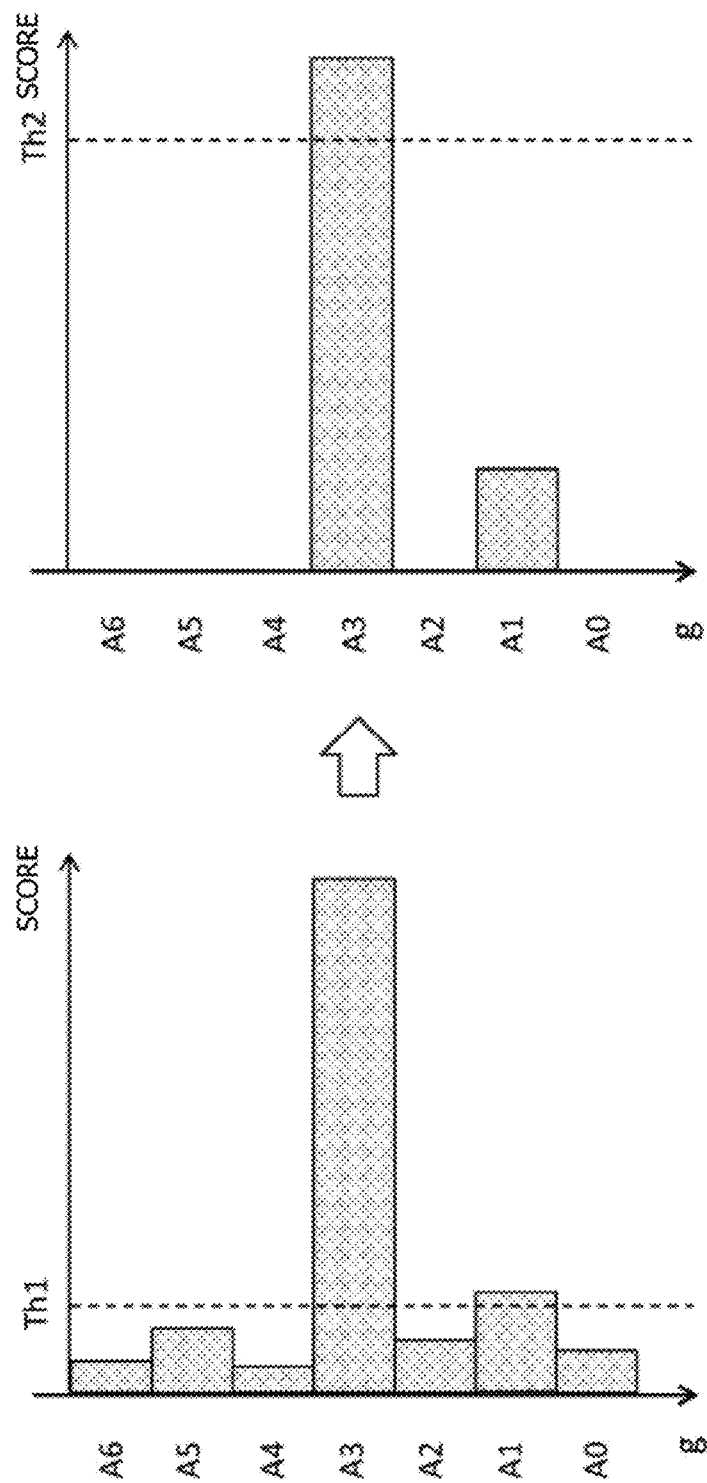
FIG. 14 is a diagram showing a distribution example of the score when the camera is oriented toward a horizontal object in the embodiment.

FIG. 14 shows a distribution example of the score when the camera is oriented toward a horizontal object in this manner. In the example of FIG. 14, it is assumed that the slice space A3 includes this horizontal object. As a result, the score of the slice space A3 is remarkably high. Here, in the case of making a threshold determination in the above-described manner, if a slice space having a score surpassing the threshold Th1 (in the example of FIG. 14, the slice space A1) accidentally appears because of noise in the image and an error in the position of the coordinate point and this slice space is detected earlier than the slice space A3, possibly this slice space will be decided as a floor or the like.

When the whole of the scores is seen, obviously the probability of that the slice space A3 includes a horizontal object is high because of the degree of concentration of the coordinate points. However, if the threshold determination is carried out with the direction settled as described above, the position of a floor will be erroneously detected due to detecting the slice space A1 earlier or it will be determined that horizontal objects are included in both the slice spaces A1 and A3. In order to detect the slice space including a horizontal object with higher accuracy in various cases including such a case, a threshold determination with a second threshold Th2 may be introduced.

In this case, first, slice spaces whose score surpasses the first threshold Th1 are detected by searching all slice spaces. In the case of FIG. 14, the slice spaces A1 and A3 are detected. Next, the threshold determination with use of the second threshold Th2 is carried out on the slice spaces A1 and A3, whose score surpasses the first threshold Th1. Because the second threshold Th2 is set for the purpose of detecting a slice space having an extreme score like this, a high value such as about 80% of the total number of coordinate points is set as the second threshold Th2.

Then, if there is a slice space having a score larger than the second threshold Th2, the slice space is determined to be a slice space including a horizontal object and the extraction result other than it is discarded. In the case of FIG. 14, the slice space A3 is detected finally. If a slice space whose score is remarkably high like the slice space A3 does not exist, this means that the camera is not oriented vertically upward or downward and the coordinate points are distributed across the whole three-dimensional space as shown in FIG. 12. Therefore, it can be concluded that a horizontal object exists in each of the plural slice spaces extracted by the threshold determination with use of the first threshold Th1.

The plane identifying portion 64 further analyzes the distribution of coordinate points in the slice space extracted in this manner to thereby identify an actual horizontal object with high accuracy. As described above, the slice space has sections perpendicular to the gravity vector g separately identified. Thus, the sections substantially correspond with horizontal planes in the real space. However, even with a slight angle error included in the section, a positional deviation in the vertical direction at an end of the horizontal object is larger when the area of the horizontal object is wider. As a result, in e.g. the case of implementing AR, employing the extracted slice space as the basis possibly causes an unnatural positional deviation between a rendered three-dimensional object and an actual image.

Figure 15:
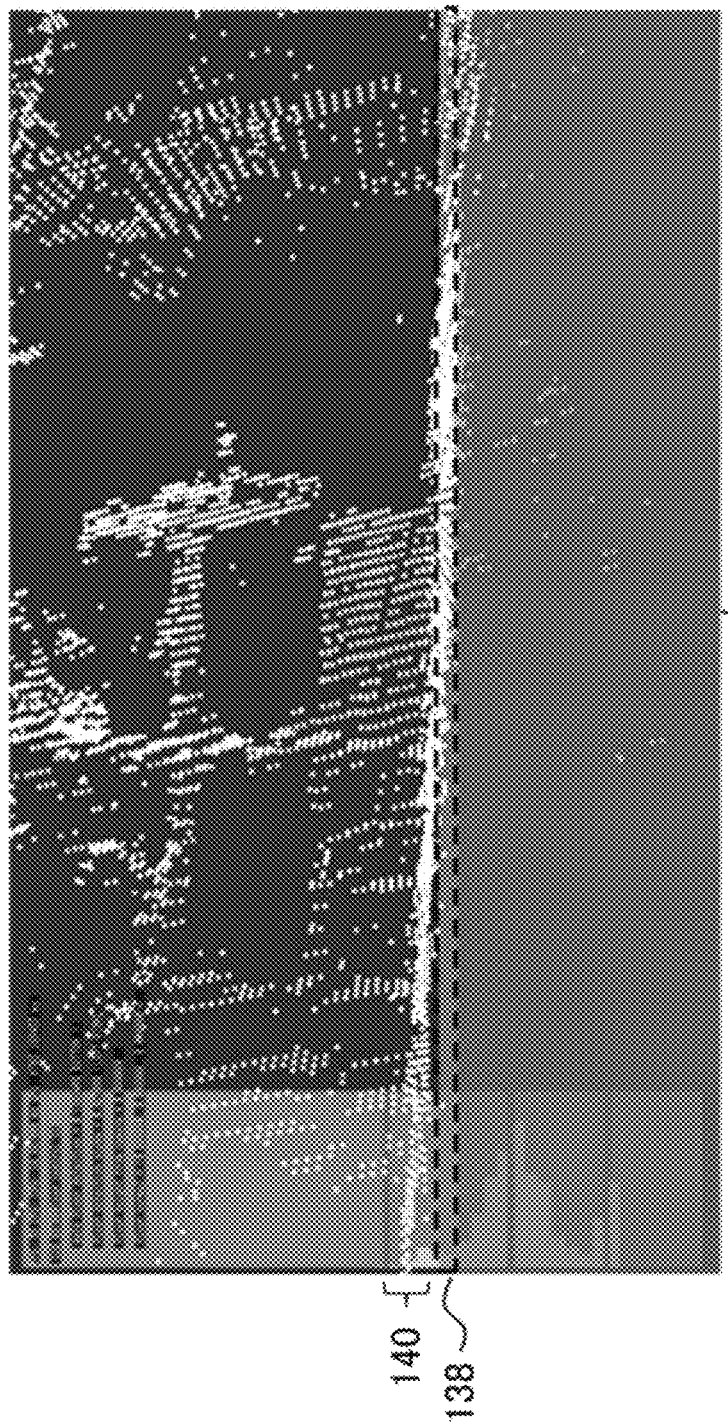
FIG. 15 is a diagram showing an example of a positional deviation that occurs due to an error in measurement of the gravity vector in the embodiment.

FIG. 15 shows an example of a positional deviation that actually occurs. An image 136 represents a state when the distribution of coordinate points represented by white dots in a three-dimensional space is viewed substantially from the horizontal direction. Here, suppose that the slice space evaluating portion 62 extracts a slice space 138 surrounded by dotted lines. Meanwhile, although the coordinate point collection thought to actually represent a horizontal object is distributed as a continuous band 140 near the extracted slice space 138, the inclination thereof is subtly different from that of the slice space 138. As a result, a non-negligible degree of positional deviation is caused at the left end of the image 136.

Figure 16:
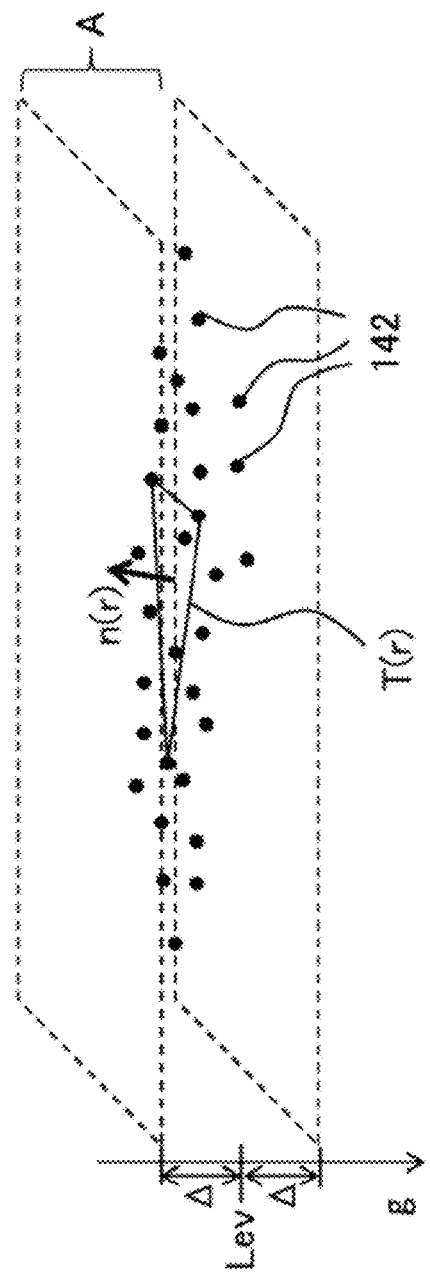
FIG. 16 is a diagram for explaining a method for identifying a horizontal object in detail by using the distribution of coordinate points.

Therefore, the plane identifying portion 64 identifies a true horizontal object by correcting the inclination of the horizontal plane on the basis of the distribution of coordinate points. FIG. 16 is a diagram for explaining a method for identifying a horizontal object in detail by using the distribution of coordinate points. First, the plane identifying portion 64 extracts a coordinate point collection 142 belonging to a slice space A extracted by the slice space evaluating portion 62. Furthermore, the plane identifying portion 64 randomly extracts combinations of three coordinate points in the coordinate point collection 142 and calculates a normal vector n(r) to a triangle T(r) formed by each combination. Here, r denotes an identification number of the combination and is a natural number satisfying $0 \leq r \leq R-1$ when the number of extracted combinations is defined as R. Then, by the following expression, a vector $n_{ave}$ obtained by averaging the individual normal vectors n(r) is calculated as the normal vector to the horizontal object.

$$\overrightarrow{n_{ave}} = \sum_{r=0}^{R-1} \overrightarrow{n(r)} \qquad (5)$$

The error can be made small by employing, as the normal vector n(r) incorporated in the average, only the value of the triangle T(r) having an area larger than a predetermined threshold. Furthermore, if the acute angle formed by the normal vector n(r) and the axis of the gravity vector g surpasses a predetermined threshold, this normal vector n(r) is deemed as invalid. This can exclude abnormal values due to noise and the influence of coordinate points representing an object other than the horizontal object. The number of extracted combinations is decided according to the number of coordinate points belonging to the target slice space and is set to about half the number of these coordinate points for example. The position (height) of the horizontal object may be set to a position Lev that bisects the thickness of the extracted slice space A or may be set to the average position of the coordinate point collection belonging to the slice space A. By deciding the normal vector and the position in this manner, the plane of the horizontal object can be defined with high accuracy and processing at subsequent stages, such as AR, can be precisely carried out.

Figure 17:
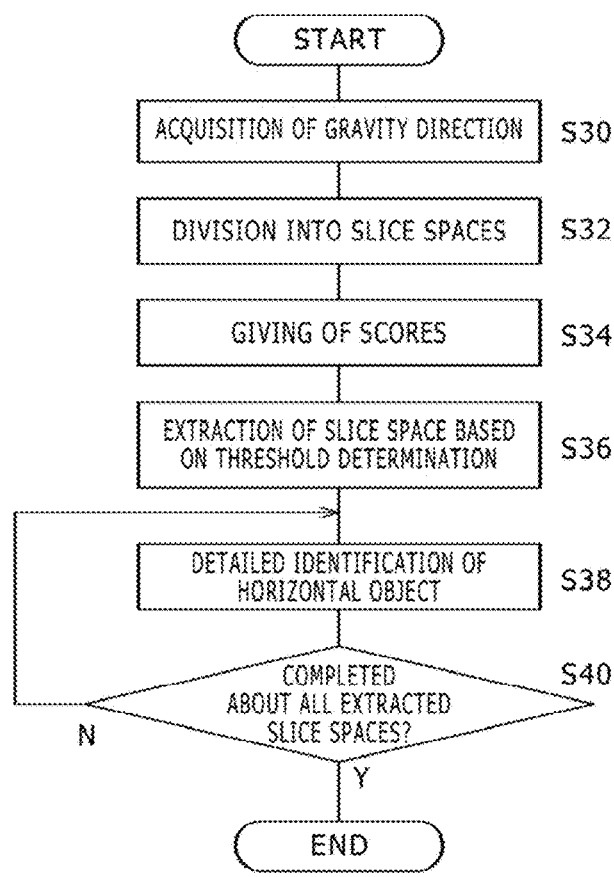
FIG. 17 is a flowchart showing the procedure of identification of a horizontal object carried out by the spatial structure identifying section of a position information generating block in S16 in FIG. 4.

FIG. 17 is a flowchart showing the procedure of identification of a horizontal object carried out by the spatial structure identifying section 54 of the position information generating block 46 in S16 in the flowchart of FIG. 4. First, the gravity direction acquiring portion 60 acquires the direction of the gravity vector g (S30). Next, the slice space evaluating portion 62 plots coordinate points in a three-dimensional space by performing inverse projective transformation of a depth image and divides this space into a predetermined number of slice spaces by planes perpendicular to the gravity vector (S32). Then, the slice space evaluating portion 62 gives scores to the slice spaces according to a predetermined rule on the basis of the coordinate points belonging to each slice space (S34).

Next, the slice space evaluating portion 62 extracts the slice space having the score surpassing a threshold by carrying out a threshold determination on the slice spaces in a predetermined direction (S36). The threshold may be switched according to the texture of an assumed target object and so forth as described above. Furthermore, that the camera is in a state of being oriented vertically upward or downward may be detected from the degree of concentration of coordinate points by carrying out the extraction at two stages with use of the first threshold Th1 and the second threshold Th2 and, in such a case, extraction of only the horizontal object toward which the camera is oriented may be allowed.

Next, about each slice space extracted in S36, the plane identifying portion 64 employs the average of the normal vectors to plural planes formed by combinations of the coordinate points included in the slice space as the normal vector to a horizontal object, and deems the center of the slice space or the average position of the coordinate points as the position of the horizontal object. Therefore, the plane identifying portion 64 identifies the plane of the horizontal object in detail (S38). The processing of S38 is repeated until the identification processing about all slice spaces extracted in S36 ends (N of S40), and the processing is ended when a horizontal object can be identified for all slice spaces (Y of S40).

The examples described thus far relate to the method for identifying the positions of objects configuring horizontal planes, such as floor, table, and ceiling, among subjects. However, the positions of walls may be identified by applying this method. Because the horizontal object is typically in a perpendicular relationship with the gravity vector g, its normal vector can be settled from the gravity vector g, excluding a minute amount of correction. On the other hand, the orientation of a wall is freely set depending on the structure of a room and so forth and therefore its normal vector is uncertain except for a restraint condition that the normal vector is perpendicular to the gravity vector g. Therefore, to identify the position of the wall, first the orientation thereof is identified.

A method to be described next is based on the assumption that the position in the depth direction has been obtained regarding the space of 360° around the imaging device 12. For example, coordinate points regarding all orientations are obtained by generating depth images regarding the respective orientations while causing the imaging device 12 to make one rotation around the axis of the gravity vector g and performing inverse projective transformation of the depth images to a common three-dimensional space. At this time, if a camera having a wide angle of view like a fisheye-lens camera is used, information in a wide range can be obtained at a time, which provides high efficiency. Alternatively, a device capable of acquiring the distance in the depth direction regarding the orientations of 360° at a time like a multi-viewpoint camera may be used.

Figure 18:
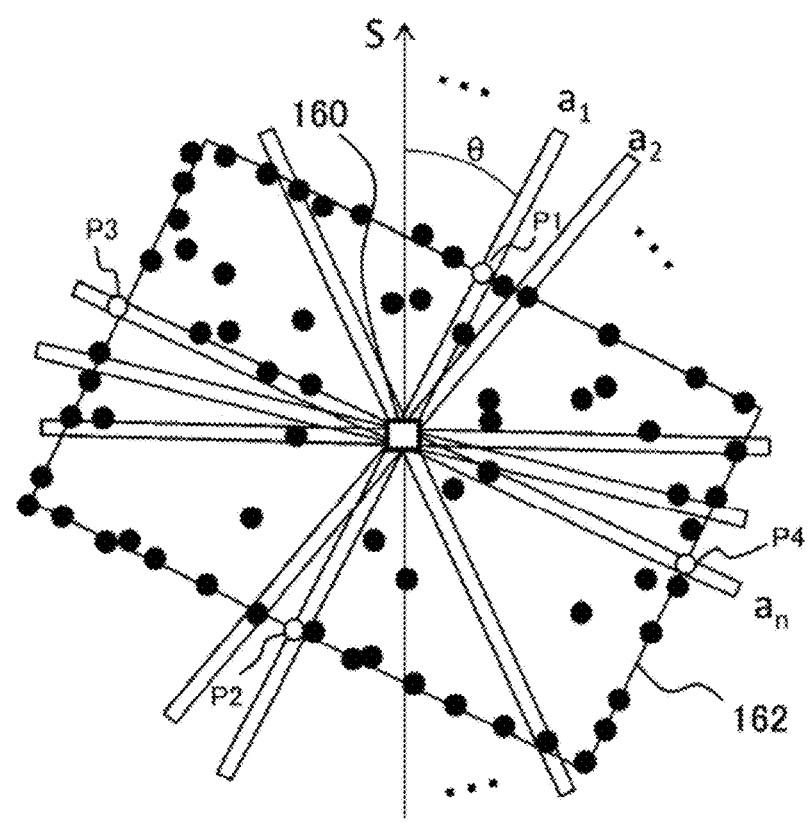
FIG. 18 is a diagram for explaining a method for identifying the angles of walls in a three-dimensional space in the embodiment.

FIG. 18 is a diagram for explaining a method for identifying the angles of walls in a three-dimensional space. Black circles and white circles shown in FIG. 18 indicate a state when the distribution of coordinate points plotted in the three-dimensional space around the imaging device 12 is viewed in the same direction as the gravity vector g, i.e. in the vertically-downward direction. Here, the imaging device 12 exists at a position 160 indicated by a white square. Furthermore, suppose that four sides of a rectangle 162 are walls of the identification target. Naturally, coordinate points are distributed at the positions of the walls. In order to identify the angles of the walls in such an environment, the slice space evaluating portion 62 disposes a predetermined number of slice spaces that are parallel to the gravity vector g or perpendicular to a horizontal object previously obtained and have a predetermined thickness around the position 160 of the imaging device 12 with changes in the placement angle by a minute angle for each change.

In FIG. 18, elongate rectangles given symbols $a_1, a_2, \ldots, a_n, \ldots$ represent the slice spaces at various angles. However, the slice spaces shown in the diagram are part thereof and actually the slice spaces are uniformly disposed in a range of $0 \leq \theta \leq 180°$ when $\theta$ denotes the angle formed by the slice space and a predetermined reference direction S. The increment width of the angle $\theta$ is decided according to the thickness of the slice space, the desired accuracy of the position identification, the number of coordinate points, and so forth. If a horizontal object such as a floor can be accurately identified in advance by the processing procedure shown in FIG. 17, the slice spaces $a_1, a_2, \ldots, a_n, \ldots$ can be set on true vertical planes.

Then, about each of the slice spaces $a_1, a_2, \ldots, a_n$, the coordinate points belonging to it are extracted and a score is given. However, in this case, because the orientations of the walls of the room represented by the rectangle 162 are identified, the method for calculating the score is different from that in the case of detecting the position of the horizontal object. Specifically, a characteristic is utilized that, in the case of a rectangular room like that shown in the diagram, a line segment representing the shortest distance between walls opposed to each other exists on a straight line perpendicularly intersecting both walls.

In the example of FIG. 18, assuming that the slice space $a_1$ perpendicularly intersects walls, the distance between the two coordinate points farthest from each other in this slice space $a_1$ (coordinate points P1 and P2 indicated by white circles) is shorter than the distance between the two coordinate points farthest from each other in each of slice spaces disposed at angles around the angle of the slice space $a_1$, such as the slice space $a_2$. Similarly, assuming that the slice space $a_n$ perpendicularly intersects walls, the distance between the two coordinate points farthest from each other in this slice space $a_n$ (coordinate points P3 and P4 indicated by white circles) is also shorter than the distance between the two coordinate points farthest from each other in each of slice spaces disposed at angles around the angle of the slice space $a_n$.

As above, the slice space in which the distance between the two coordinate points farthest from each other among the coordinate points belonging to the inside of the slice space is shorter than the distances in slice spaces around this slice space is thought to intersect walls substantially perpendicularly. Therefore, extracting this slice space can identify the normal vector to the walls. Therefore, when the distance between the two coordinate points farthest from each other as viewed from the vertical direction among the coordinate points belonging to each slice space is defined as d, 1/d is employed as the score of this slice space. However, the present embodiment is not limited thereto and $1/d^2$ may be employed as the score value. Furthermore, the distance used to extract the slice space is not limited to the distance between two coordinate points. The distance between the average positions of a predetermined number of coordinate points existing near both ends in the horizontal direction among the coordinate points belonging to the slice space may be employed as the distance d used for the score calculation.

Figure 19:
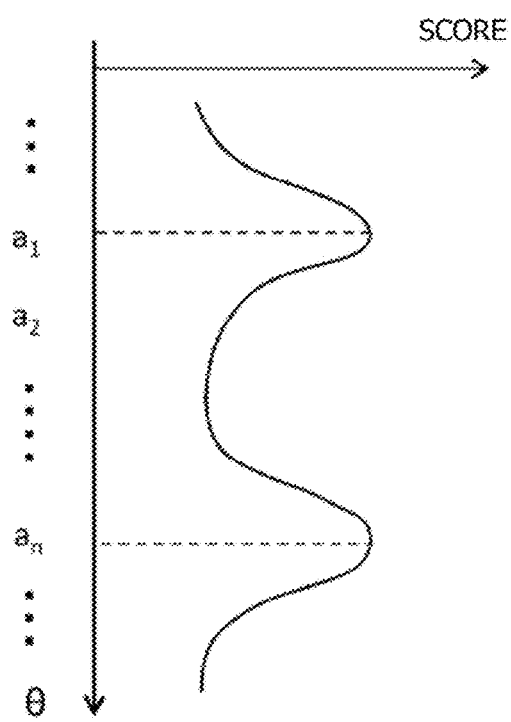
FIG. 19 is a diagram showing a change example of the scores given to slice spaces in order to identify the orientations of walls in the embodiment.

FIG. 19 shows a change example of the scores given to the slice spaces in order to identify the orientations of the walls. As shown along the ordinate axis in FIG. 19, the slice spaces $a_1, a_2, \ldots, a_n, \ldots$ are defined by the angle $\theta$ formed with the reference direction S. As described above, if the reciprocal of the distance d between the two points farthest from each other among the coordinate points belonging to each slice space is employed as the score, the score takes a local maximum value with the slice space at a right angle to the wall. In the example of FIG. 19, the score takes a local maximum value with the slice space $a_1$ and $a_n$. When the angle $\theta$ of these slice spaces is acquired, these angles correspond with those of the normal vectors to the walls because of the above-described principle.

Figure 20:
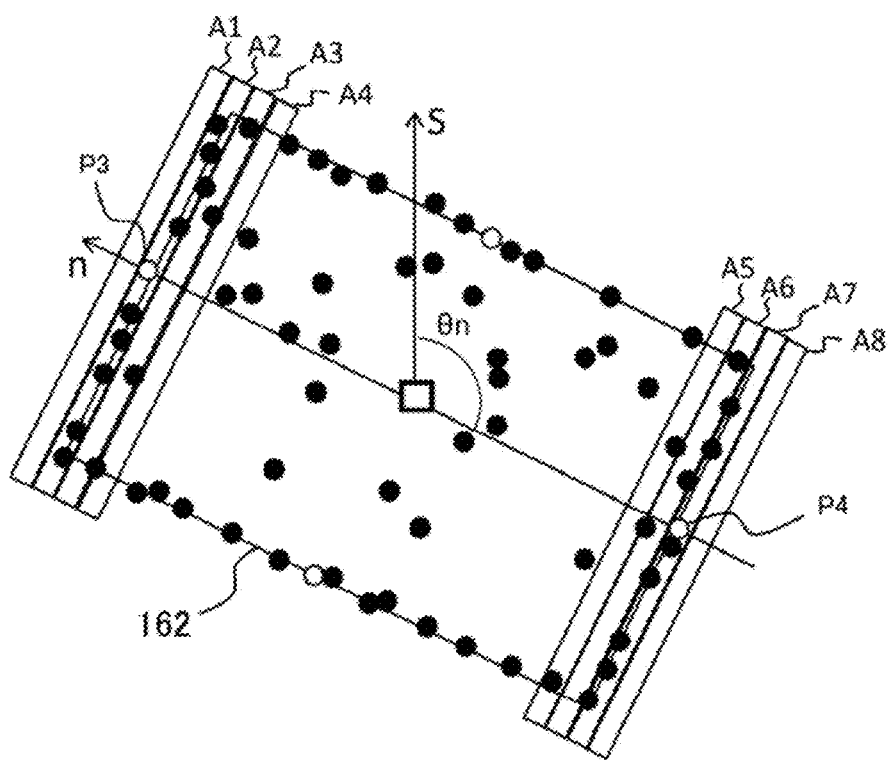
FIG. 20 is a diagram for explaining a method for identifying the positions of walls after identifying the orientations of the walls in the embodiment.

After the normal vectors are obtained in this manner, the positions of the walls are identified because planes perpendicular to these normal vectors are the walls. This processing can be implemented similarly to the above-described processing in which the horizontal object is identified by employing planes perpendicular to the gravity vector g as planes to divide a space. FIG. 20 is a diagram for explaining a method for identifying the positions of walls after identifying the orientations of the walls regarding the distribution of coordinate points represented in FIG. 18. In FIG. 20, the identification targets are the positions of the walls that are opposed to each other and have a normal vector n along a direction θn of the slice space $a_n$ of the slice spaces $a_1$ and $a_n$ extracted in the example of FIGS. 18 and 19.

First, similarly to the case of identifying the horizontal object, a predetermined number of slice spaces A1 to A8 are generated by dividing the space by planes perpendicular to the normal vector n. However, in this case, because the two coordinate points thought to be coordinate points on the walls (coordinate points P3 and P4 indicated by white circles) have been extracted in the processing for identifying the directions of the walls, the processing efficiency can be increased by generating the slice spaces only near the positions of these coordinate points in the axis direction of the normal vector n. In the case of FIG. 20, the slice spaces A1 to A4 are generated near the coordinate point P3 and the slice spaces A5 to A8 are generated near the coordinate point P4.

Then, a score is given to each of the slice spaces according to a predetermined rule on the basis of the number of coordinate points belonging to the slice space and the slice space having the score surpassing a threshold is extracted. Also at this time, it is desirable to switch the threshold according to conditions such as the texture of the wall and the illuminance similarly to the identification of a floor surface and so forth. Moreover, as described with reference to FIG. 16, the normal vector to the walls is accurately obtained by averaging the normal vectors to plural planes formed by combinations of coordinate points belonging to the extracted slice space. The position of the wall is set to the position that bisects the thickness of the extracted slice space or the average position of the coordinate point collection belonging to the slice space. This allows identification of not only horizontal objects but also the surfaces of walls with high accuracy.

Figure 21:
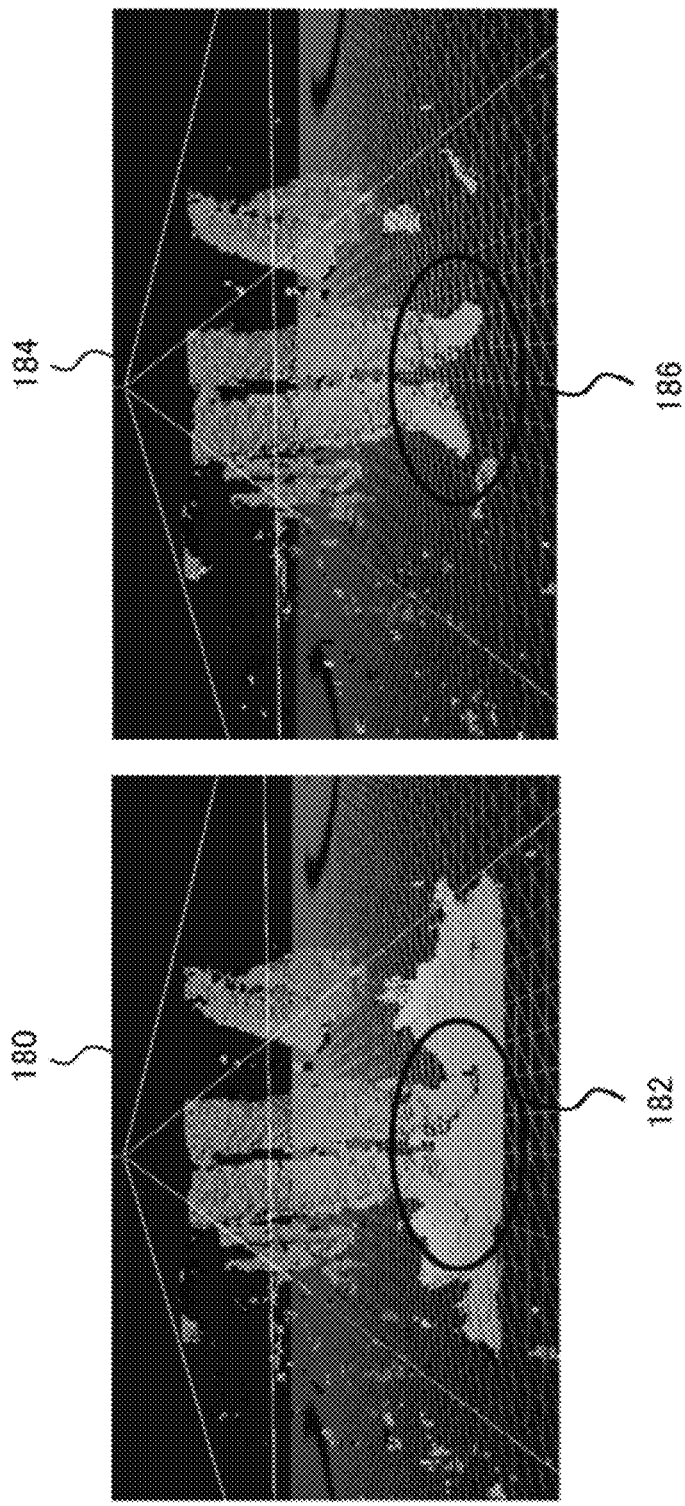
FIG. 21 is a diagram that exemplifies how a target object extracting section separates position information of feet from a floor when the feet are deemed as a target object in the embodiment.

FIG. 21 exemplifies how the target object extracting section 56 separates the position information of feet from a floor when the feet are deemed as the target object. An image 180 on the left side of FIG. 21 shows a state when the distribution of coordinate points obtained from a shot image of the feet part of a person standing on the floor is viewed from the front side. In this image 180, the toes exist in a region 182 but the determinate positions thereof are unclear because the toes are continuous with the floor. An image 184 on the right side of FIG. 21 is an image obtained by identifying the floor surface by the present embodiment and excluding the coordinate points of the floor surface part. By excluding the information on the floor surface part in this manner, the images of the toes definitely appear in a region 186 and hence the position information thereof is accurately obtained. As a result, the minute motion of the toes can be tracked with high accuracy.

According to the present embodiment described above, a depth image representing the position information of subjects in a three-dimensional space is subjected to inverse projective transformation to the three-dimensional space corresponding to the field of view of the camera and coordinate points are distributed. Then, this three-dimensional space is divided by planes perpendicular to the direction of the gravity vector separately acquired to generate plural slice spaces, and the position of an object configuring a horizontal plane is identified on the basis of the distribution of the coordinate points belonging to the slice spaces. This can give, to coordinate point collections as mere rows of points, information that the coordinate point collections configure planes such as a floor, a table, and a ceiling. Furthermore, even when the camera is freely moved, the identification of these planes can be continued. As a result, three-dimensional objects in AR can be so rendered as to match the positions of these planes. In addition, a person's body can be separated from these planes and the motion thereof can be accurately tracked.

By optimizing the thickness of the slice space depending on the calculation conditions and the shooting conditions, even when there is an error in the measurement of the gravity vector or an error in the calculation of the position coordinates of a subject, one horizontal object can be substantially encompassed by one slice space and the slice space corresponding to the horizontal object can be extracted by simple evaluation. By paying attention to the coordinate points belonging to the slice space extracted in this manner again and employing the horizontal plane formed by them as the final detection result, the horizontal object can be exactly identified even when there is an error like the above-described one. Furthermore, even when the method for acquiring the depth image, the resolution of the depth image, or the shooting condition changes, a similar processing procedure can be applied through only adjustment of the threshold. Moreover, because the depth image, for which generation techniques have been sufficiently established, is used, the barrier to introduction thereof is low and the influence on the responsiveness can also be suppressed to the minimum.

Furthermore, by carrying out a determination at two stages with use of two thresholds in extraction of the slice space, a situation in which a horizontal object exists in front of the camera and only this horizontal object should be detected can be sensed and the most probable horizontal object can be identified. In addition, not only horizontal objects but also the angles and positions of walls of a room are identified by disposing slice spaces perpendicular to the horizontal plane and performing evaluation on the slice spaces. In this case, first the slice spaces are disposed at plural angles around the imaging device 12 and the slice space along the normal direction of a wall is extracted on the basis of the closeness of the distance between the coordinate points farthest from each other in the horizontal direction in each slice space. Next, slice spaces perpendicular to this normal direction are disposed and the position of the wall is identified on the basis of the distribution of the coordinate points belonging to the slice spaces. This makes it possible to render a three-dimensional object in conformity with the position of not only a horizontal object but also a wall and separate only a person's body near a wall from the wall to accurately track the motion thereof.

The present disclosure is described above on the basis of the embodiment. The above embodiment is exemplification and it is to be understood by those skilled in the art that various modification examples can be made regarding combinations of the respective constituent elements and the respective processing processes in the embodiment and such modification examples are also included in the scope of the present disclosure.

For example, in the above embodiment, horizontal planes existing in large numbers in the real world are detected by dividing a three-dimensional space by planes perpendicular to the direction of the gravity vector. On the other hand, the dividing planes do not need to be perpendicular to the gravity vector. Specifically, if slice spaces are generated by dividing a three-dimensional space by planes having an inclination at a predetermined angle relative to the planes perpendicular to the gravity vector, planar objects having this inclination can be easily detected by the same processing procedure as the above embodiment.

The present disclosure contains subject matter related to that disclosed in Japanese Priority Patent Application JP 2014-154242 filed in the Japan Patent Office on Jul. 29, 2014, the entire content of which is hereby incorporated by reference.

What is claimed is:

1. An information processing device that detects a position of a subject shot by a camera in a three-dimensional space, the information processing device comprising:
   a depth image acquiring section configured to acquire a depth image in which distance of a subject in depth direction from the camera is represented as a pixel value on an image plane;
   a spatial structure identifying section configured to identify a position of a plane forming a predetermined angle with a gravity vector among subject surfaces by detecting a coordinate point collection representing the plane on a basis of distribution of coordinate points obtained by inverse projection of pixels of the depth image to the three-dimensional space based on direction of the gravity vector; and
   a target object extracting section configured to generate and output position information of a predetermined target object on a basis of the position of the plane,
   wherein the spatial structure identifying section generates a plurality of slice spaces having a predetermined thickness by dividing the three-dimensional space by a plurality of planes forming the predetermined angle with the gravity vector, and detects the slice space to which the coordinate point collection representing the plane belongs by evaluating coordinate points belonging to each slice space on a basis of a predetermined criterion, and
   wherein the spatial structure identifying section detects the slice space to which the coordinate point collection representing the plane belongs by evaluating the coordinate points belonging to each slice space on a basis of a total value obtained by performing weighting according to the distance from the camera and summing up weighting results.

2. The information processing device according to claim wherein
   the spatial structure identifying section detects the slice space with which the total value surpasses a predetermined threshold as the slice space to which the coordinate point collection representing the plane belongs, and switches the threshold according to texture of the plane.

3. The information processing device according to claim 1, wherein
   the spatial structure identifying section generates a plurality of slice spaces that are parallel to the gravity vector and have a predetermined thickness at a plurality of rotation angles about an axis of the gravity vector, and identifies a normal vector to two planes that are parallel to the gravity vector and are opposed in parallel to each other among the subject surfaces on a basis of distance between coordinate points farthest from each other in horizontal direction among coordinate points belonging to each slice space, and
   the spatial structure identifying section further generates a plurality of slice spaces having a predetermined thickness by dividing the three-dimensional space by a plurality of planes perpendicular to the normal vector, and detects the slice spaces to which coordinate point collections representing the two planes belong on a basis of the number of coordinate points belonging to each slice space.

4. The information processing device according to claim 1, wherein
   the spatial structure identifying section employs, as a normal vector to the plane, an average of normal vectors to a plurality of planes formed by combinations of coordinate points extracted a plurality of times from the coordinate point collection that is detected.

5. The information processing device according to claim 1, wherein
   the spatial structure identifying section acquires the direction of the gravity vector in the three-dimensional space on a basis of an output signal from an acceleration sensor incorporated in the camera.

6. The information processing device according to claim 1, wherein
   the spatial structure identifying section acquires the direction of the gravity vector in the three-dimensional space on a basis of input from a user to specify the direction of the gravity vector on a shot image displayed on a display device.

7. The information processing device according to claim 1, wherein
   the spatial structure identifying section acquires, from the camera, a moving image obtained by shooting a situation in which a user drops an object, and acquires the direction of the gravity vector in the three-dimensional space on a basis of direction of the dropping of the object in a field of view of the camera.

8. The information processing device according to claim 1, wherein
   the target object extracting section excludes coordinate points representing the plane to generate position information of a target object in contact with the plane.

9. An information processing method in which an information processing device detects a position of a subject shot by a camera in a three-dimensional space, the information processing method comprising:
   acquiring a depth image in which distance of a subject in depth direction from the camera is represented as a pixel value on an image plane and storing the depth image in a memory;
   identifying a position of a plane forming a predetermined angle with a gravity vector among subject surfaces by detecting a coordinate point collection representing the plane on a basis of distribution of coordinate points obtained by inverse projection of pixels of the depth image read from the memory to the three-dimensional space based on direction of the gravity vector;
   generating a plurality of slice spaces having a predetermined thickness by dividing the three-dimensional space by a plurality of planes forming the predetermined angle with the gravity vector, and detects the slice space to which the coordinate point collection representing the plane belongs by evaluating coordinate points belonging to each slice space on a basis of a predetermined criterion;

detecting the slice space to which the coordinate point collection representing the plane belongs by evaluating the coordinate points belonging to each slice space on a basis of a total value obtained by performing weighting according to the distance from the camera and summing up weighting results; and generating and outputting position information of a predetermined target object on a basis of the position of the plane.

10. A non-transitory computer readable medium having stored thereon a computer program that causes a computer to implement detecting a position of a subject shot by a camera in a three-dimensional space, the computer program causing the computer to implement a configuration comprising:

acquiring a depth image in which distance of a subject in depth direction from the camera is represented as a pixel value on an image plane;

identifying a position of a plane forming a predetermined angle with a gravity vector among subject surfaces by detecting a coordinate point collection representing the plane on a basis of distribution of coordinate points obtained by inverse projection of pixels of the depth image to the three-dimensional space based on direction of the gravity vector;

generating a plurality of slice spaces having a predetermined thickness by dividing the three-dimensional space by a plurality of planes forming the predetermined angle with the gravity vector, and detects the slice space to which the coordinate point collection representing the plane belongs by evaluating coordinate points belonging to each slice space on a basis of a predetermined criterion;

detecting the slice space to Which the coordinate point collection representing the plane belongs by evaluating the coordinate points belonging to each slice space on a basis of a total value obtained by performing weighting according to the distance from the camera and summing up weighting results; and generating and outputting position information of a predetermined target object on a basis of the position of the plane.

* * * * *